US011818462B2

(12) United States Patent
Galor Gluskin et al.

(10) Patent No.: US 11,818,462 B2
(45) Date of Patent: Nov. 14, 2023

(54) PHASE DETECTION AUTOFOCUS SENSOR APPARATUS AND METHOD FOR DEPTH SENSING

(71) Applicant: QUALCOMM Incorporated, San Diego, CA (US)

(72) Inventors: Micha Galor Gluskin, San Diego, CA (US); Biay-Cheng Hseih, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/003,807

(22) Filed: Aug. 26, 2020

(65) Prior Publication Data

US 2021/0067705 A1 Mar. 4, 2021

Related U.S. Application Data

(60) Provisional application No. 62/893,982, filed on Aug. 30, 2019.

(51) Int. Cl.
*H04N 23/67* (2023.01)
*G06T 7/521* (2017.01)
(Continued)

(52) U.S. Cl.
CPC ........... *H04N 23/672* (2023.01); *G06T 7/521* (2017.01); *G06T 7/55* (2017.01); *G06T 7/80* (2017.01);
(Continued)

(58) Field of Classification Search
CPC ........... H04N 5/232122; H04N 5/2251; H04N 5/23203; H04N 5/23209; H04N 5/232121;
(Continued)

(56) References Cited

U.S. PATENT DOCUMENTS 8,885,890 B2 11/2014 Tardif
9,906,772 B2 2/2018 Chen et al.
(Continued)

FOREIGN PATENT DOCUMENTS

CN 107888829 A 4/2018
JP 2016090785 A * 5/2016

OTHER PUBLICATIONS

Achar S., "Active Illumination for the Real World", CMU-RI-TR-17-65, Jul. 2017, 133 pages.
(Continued)

*Primary Examiner* — Usman A Khan
(74) *Attorney, Agent, or Firm* — Polsinelli/Qualcomm

(57) ABSTRACT

Various embodiments are directed to a device including an infrared phase detection autofocus (PDAF) sensor. The device may include a projector configured to transmit a source light onto a scene. The device may include the infrared PDAF sensor configured to receive reflections of the source light off of objects within the scene. The infrared PDAF sensor may include a first set of pixels including focus pixels. The device may include a processor coupled to the infrared PDAF sensor and a memory. The processor may be configured to generate first depth data based on the received reflections of the source light. The processor may be configured to generate second depth data based on signals generated from corresponding pairs of the focus pixels. The (Continued)

processor may be configured to generate combined depth data based on the first depth data and the second depth data.

33 Claims, 12 Drawing Sheets

(51) Int. Cl.
  *G06T 7/80* (2017.01)
  *G06T 7/55* (2017.01)
(52) U.S. Cl.
  CPC .............. *G06T 2207/10028* (2013.01); *G06T 2207/10048* (2013.01)
(58) Field of Classification Search
  CPC .. H04N 5/36961; H04N 5/33; H04N 5/37457; G06T 7/521; G06T 7/55; G06T 7/80; G06T 2207/10028; G06T 2207/10048; G06T 7/593; G01S 17/894; G01S 17/86; G01S 11/12; G01S 17/36; G01S 17/42; G01S 17/48; G01S 7/4914; G03B 13/36
  USPC ........................................................ 348/345
  See application file for complete search history.

(56) References Cited

U.S. PATENT DOCUMENTS

| | | |
|---|---|---|
| 10,044,926 B2 | 8/2018 | Galor et al. |
| 10,271,033 B2 | 4/2019 | Kamal et al. |
| 2006/0115160 A1* | 6/2006 | Jung .......................... G06T 7/12 382/199 |
| 2012/0038810 A1* | 2/2012 | Taniguchi .......... H04N 5/36961 348/308 |
| 2015/0049172 A1* | 2/2015 | Ramachandra ........... G06T 7/85 348/47 |
| 2015/0062558 A1* | 3/2015 | Koppal ................... G01S 17/46 356/5.01 |
| 2017/0006211 A1* | 1/2017 | Gurbuz ................. H04N 23/69 |
| 2017/0187948 A1* | 6/2017 | Wang ..................... G02B 5/201 |
| 2018/0068424 A1* | 3/2018 | Kwon ................... G01S 17/894 |
| 2019/0362511 A1* | 11/2019 | Jouppi ...................... G06T 5/50 |

OTHER PUBLICATIONS

International Search Report and Written Opinion—PCT/US2020/048210—ISA/EPO—dated Nov. 20, 2020.

\* cited by examiner

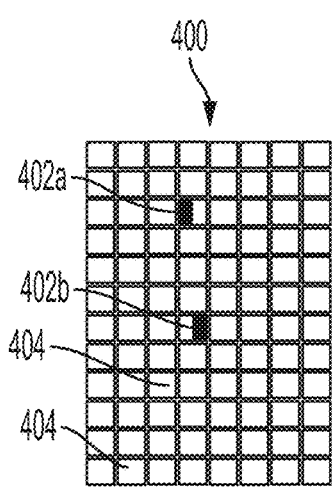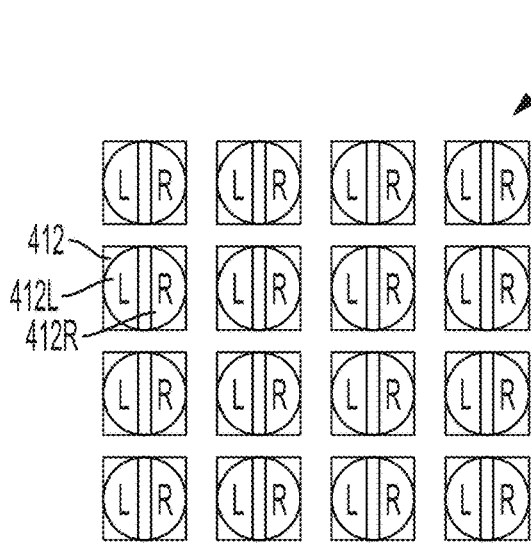
*FIG. 4A*  *FIG. 4B*
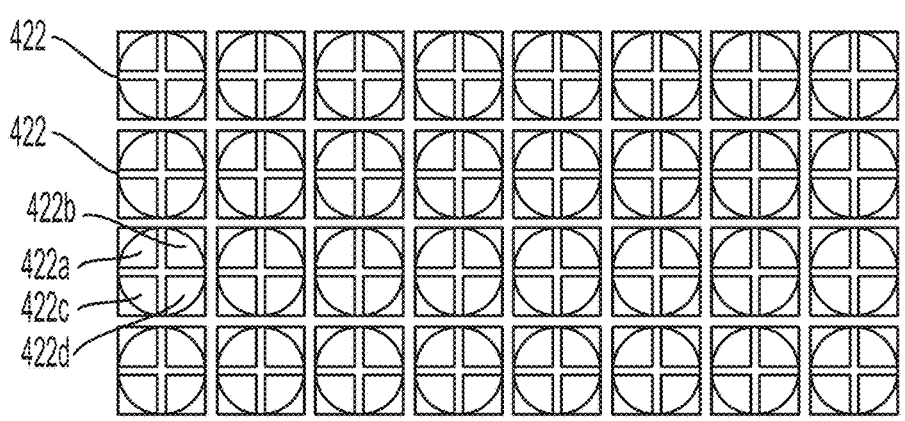
*FIG. 4C*
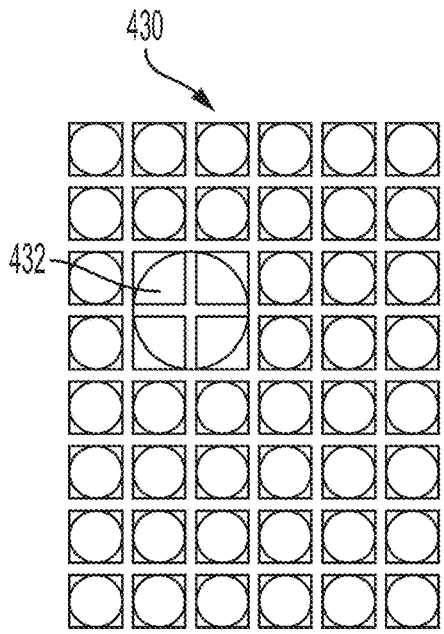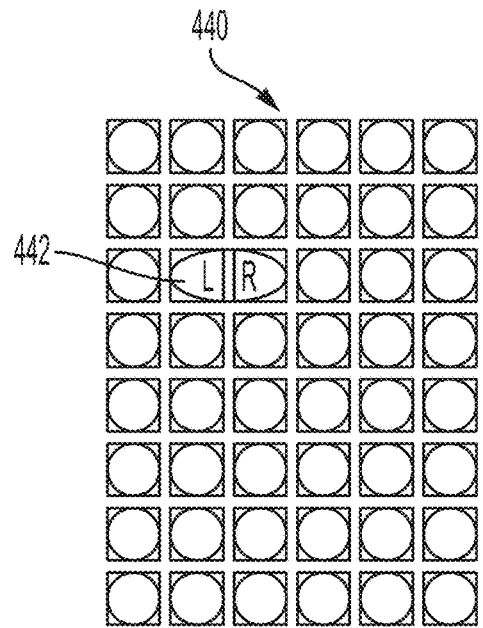
*FIG. 4D*  *FIG. 4E*

PHASE DETECTION AUTOFOCUS SENSOR APPARATUS AND METHOD FOR DEPTH SENSING

CLAIM OF PRIORITY

This application claims priority to U.S. Provisional Patent Application Ser. No. 62/893,982, titled "PDAF SENSOR" filed Aug. 30, 2019, which is hereby incorporated by reference in its entirety.

TECHNICAL FIELD

This disclosure relates to optical sensors, and specifically to a phase detection autofocus (PDAF) sensor.

BACKGROUND

A device may determine distances of its surroundings using different depth sensing or depth ranging systems. Depth sensing systems may include active depth systems and/or passive depth systems. Active depth systems include structured light systems, time-of-flight (TOF) systems, and the like. Passive depth systems include stereo or multiple camera systems and the like. Each of the different depth sensing systems have strengths and limitations compared to the other depth sensing systems. For example, active depth systems that transmit infrared (IR) or near-infrared (NIR) light work well in low visible light conditions, but may suffer from noise in bright outdoor conditions due to ambient light. Consumer active depth systems are increasingly tasked with outdoor operation for applications such as biometric security. Depth systems may transmit in a narrowband and any unwanted out of band leakage due to sunlight may decrease signal-to-noise ratios which provides degraded depth results. Alternatively, passive depth systems work well in daylight, but not in low light conditions or flat and/or untextured regions. Additional limitations of the various depth sensing systems may include calibration requirements and dimensions. For example, calibration is required for active depth systems and structured light and stereo systems include wide device dimensions because a wide baseline is required between a transmitter and sensor and/or between sensors.

SUMMARY OF THE INVENTION

This disclosure describes various embodiments of an infrared sensor including focus pixels.

Various embodiments may include a device including a projector and an infrared phase detection autofocus (PDAF) sensor. The projector may be configured to transmit a source light onto a scene. The infrared PDAF sensor may be configured to receive reflections of the source light off of objects within the scene. The device may include a memory and a processor. The processor may be coupled to the memory and the infrared PDAF sensor. The processor may be configured to generate first depth data based on the received reflections of the source light, generate second depth data based on focus pixels of the infrared PDAF sensor, and generate combined depth data based on the first depth data and the second depth data.

In some aspects, the infrared PDAF sensor may include a plurality of pixels. The plurality of pixels may include a first set of pixels including the focus pixels. The plurality of pixels may include a second set of pixels including a narrowband filter. At least a subset of the first set of pixels may include the narrowband filter.

In some aspects, generation of the second depth data may be based on determined disparities between signals generated from corresponding pairs of focus pixels.

In some aspects, the infrared PDAF sensor may include one or more filters. The one or more filters may include one or more of a narrowband filter. The one or more filters may include one or more of a color filter. The one or more filters may be mechanically controlled to move above one or more pixels of the infrared PDAF sensor.

In some aspects, the infrared PDAF sensor may be included within an active depth system. The first depth data may be generated based on the active depth system.

In some aspects, the source light may include infrared light. In some aspects, the source light may include a pattern. The pattern may include a structured pattern. In some aspects, the source light may include a flood pattern.

In some aspects, generating the combined depth data may include combining a portion of the first depth data and a portion of the second depth data based upon the first set of confidence values associated with the first depth data and the second set of confidence values associated with the second depth data.

In some aspects, combining the portion of the first depth data and the portion of the second depth data based upon the first set of confidence values associated with the first depth data and the second set of confidence values associated with the second depth data may include comparing a first confidence value of the first set of confidence values associated with the first depth data to a corresponding second confidence value of the second set of confidence values associated with the second depth data, determining, based on the comparison, a higher confidence value between the first confidence value and the second confidence value, and selecting a depth value associated with the higher confidence value to include within the combined depth data.

In some aspects, combining the portion of the first depth data and the portion of the second depth data based upon the first set of confidence values associated with the first depth data and the second set of confidence values associated with the second depth data may include assigning a first weight to a first depth value associated with a first confidence value of the first set of confidence values associated with the first depth data, assigning a second weight to a corresponding second depth value associated a corresponding second confidence value of the second set of confidence values associated with the second depth data, wherein the first weight is proportional to the first confidence value and the second weight is proportional to the second confidence value, and selecting a first weighted depth value associated with the first depth data and a second weight depth value associated with the second depth data to include within the combined depth data.

In another aspect, a method is disclosed. The method may include generating first depth data based on an active depth system including an infrared phase detection autofocus (PDAF) sensor. The method may further include generating second depth data based on focus pixels included within the infrared PDAF sensor. The method may further include generating combined depth data based on the first depth data and the second depth data.

In yet another aspect, a non-transitory computer-readable storage medium is disclosed. The non-transitory computer-readable storage medium may store instructions thereon that, when executed, cause one or more processors to generate first depth data based on an active depth system including an infrared phase detection autofocus (PDAF) sensor, generate second depth data based on focus pixels included within the infrared PDAF sensor, and generate combined depth data based on the first depth data and the second depth data.

In a further aspect, a device is disclosed. The device may include means for generating first depth data based on an active depth system including an infrared phase detection autofocus (PDAF) sensor. The device may include means for generating second depth data based on focus pixels included within the infrared PDAF sensor. The device may further include means for generating combined depth data based on the first depth data and the second depth data.

The details of one or more examples are set forth in the accompanying drawings and the description below. Other features, objects, and advantages will be apparent from the description, drawings, and claims.

BRIEF DESCRIPTION OF THE DRAWINGS

FIGS. 4A-4E depict different pixel array configurations including different focus pixels.

DETAILED DESCRIPTION

Figure 1:
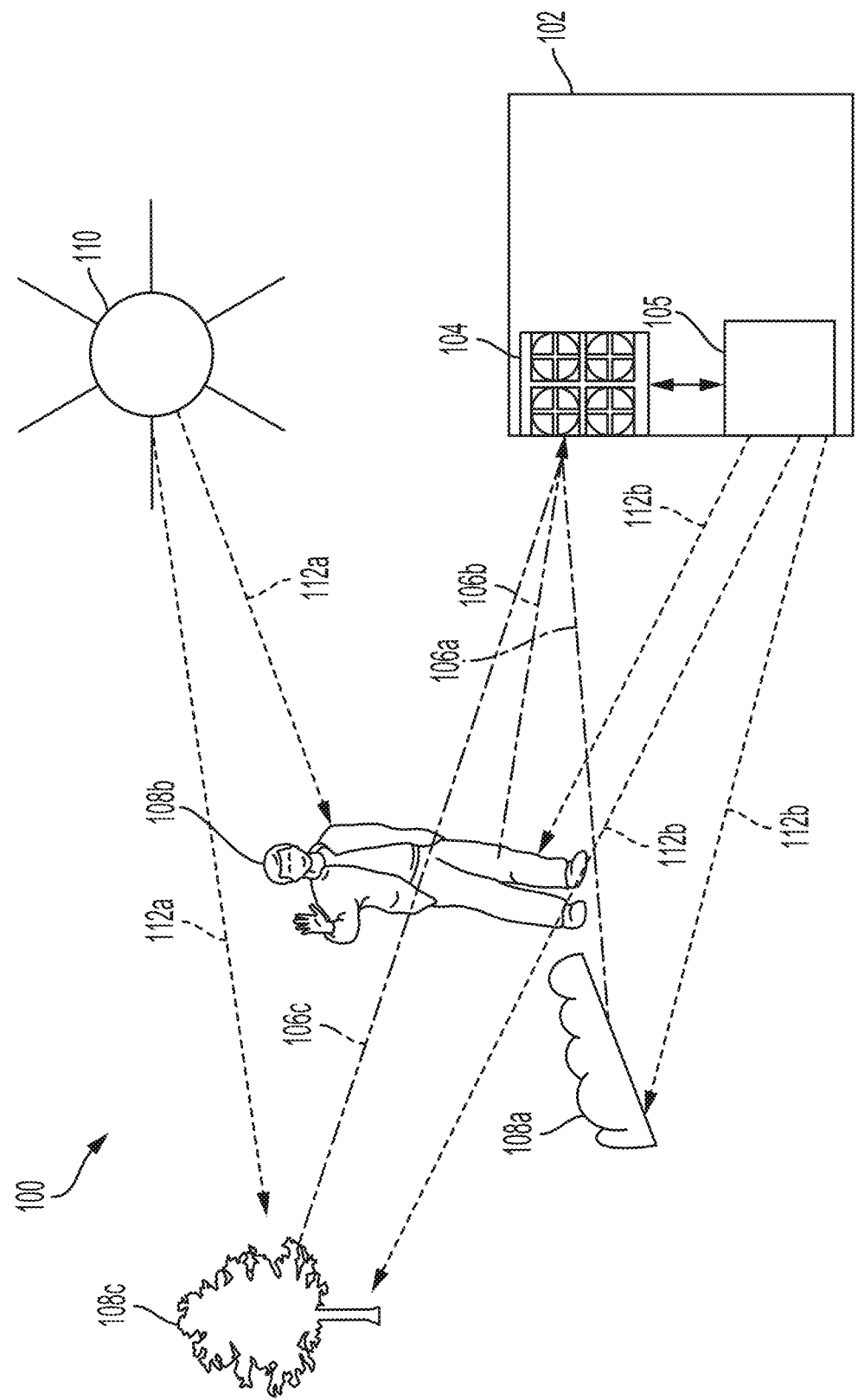
FIG. 1 is an example diagram illustrating a device and a scene including a field of view of the device.

In overview, various examples disclosed herein provide for a device including an infrared phase detection autofocus (PDAF) sensor. The device may include a projector or transmitter configured to transmit a source light onto a scene. The infrared PDAF sensor may be configured to receive reflections of the source light off of objects within the scene. The device may include a memory and a processor coupled to the memory and the infrared PDAF sensor. The processor may be configured to generate first depth data based on the received reflections of the source light, generate second depth data based on focus pixels of the infrared PDAF sensor, and generate combined depth data based on the first depth data and the second depth data.

Benefits of this disclosure include generating improved depth data for a scene by receiving light at a single sensor including focus pixels such that depth data may be generated by both an active depth system and the focus pixels. Calibration requirements may be reduced for the device because depth data generated by focus pixels of the infrared PDAF sensor may be used to calibrate the active depth system including the projector and the infrared PDAF sensor. Some active depth systems, including structured light systems, require calibration of both the projector and the sensor. In some calibration methods, the sensor is first calibrated and then is used to calibrate the projector. However, this propagates any error of the sensor calibration into the projector calibration. Conversely, PDAF does not require calibration. As such, using depth data generated by the focus pixels of the infrared PDAF sensor (e.g., the focus pixels of the same sensor used in the active depth system) may help calibrate the active depth system faster and more accurately. Further, the device may have narrower dimensions than a traditional structured light system because a large baseline is not required between the transmitter (e.g., projector) and the receiver (e.g., the infrared PDAF sensor) since the depth data generated by the focus pixels of the infrared PDAF sensor may be used to improve the depth data generated by the structured light system. In some examples, a single sensor may be used to capture IR and/or NIR light in addition to visible light, thus reducing the size of the device. As will be discussed in further detail below, the infrared PDAF sensor may include one or more filters. The one or more filters may include one or more color filters and/or one or more narrowband filters. In this manner, the infrared PDAF sensor may be used to capture IR and/or NIR light in addition to visible light.

Various embodiments will be described in detail with reference to the accompanying drawings. Generally, the same reference numbers will be used throughout the drawings to refer to the same or similar part. References made to particular examples and implementations are for illustrative purposes only, and are not intended to limit the scope of the disclosure or the claims.

FIG. 1 is a diagram illustrating a scene, a device 102, and various objects within the scene and within a field of view of the device 102. As shown in FIG. 1, the device 102 may include an optical receiver 104 (also referred to herein as a receiver and/or sensor) and an optical transmitter 105 (also referred to herein as a transmitter and/or projector). Examples of device 102 may include an image capture device, such as a camera, that may be or may be part of a desktop computer, a laptop computer, a tablet, a personal digital assistant, a personal camera, a digital camera, an action camera, a mounted camera, a connected camera, a wearable device, an automobile, a drone, a wireless communication device, a phone, a television, a display device, a digital media player, a video game console, or a video streaming device. Device 102 may be capable of capturing still or moving images, regardless of format (e.g., digital, film, etc.) or type (e.g., video camera, still camera, web camera, etc.). Device 102 may include an active depth mapping system. Active depth mapping systems may include, but are not limited to, a time of flight system, a structured light system, or the like. Device 102 may be used to capture images (e.g., 2D images, 3D images, depth maps, etc.) for various purposes including, but not limited to, biometric security (e.g., face scan, gestures, etc.), leisure, and the like.

Examples of optical transmitter 105 may include a projector, a laser, or the like. Examples of optical receiver 104 may include one or more optical sensors (e.g., image sensors), such as the infrared PDAF sensor disclosed herein. In some examples, optical transmitter 105 may transmit a source light (e.g., infrared (IR) light, near-infrared (NIR), light, a pattern, a structured pattern, a flood pattern, one or more codewords, a flash, etc.) into the scene and the optical receiver 104 may receive visible light and/or the source light reflected off of objects within the scene. In some embodiments, optical transmitter 105 may transmit (e.g., emit) the source light in a narrowband of particular wavelengths and/or ranges of wavelengths of light (e.g., the source light may include a narrowband of wavelengths of light). A baseline is depicted by the arrow between optical transmitter 105 and optical receiver 104. While a traditional structured light system requires a large baseline between the projector and sensor, in cases of the device disclosed herein including a structured light system, the device disclosed herein may reduce the baseline between the projector (e.g., optical transmitter 105) and sensor (e.g., optical receiver 104) due to the focus pixels included within the sensor of the structured light system.

As used herein, IR is a region of the electromagnetic radiation spectrum where wavelengths range from about 700 nanometers (nm; 0.7 micrometers) to 1 millimeter (mm; 1,000 micrometers). IR waves are longer than those of visible light. The IR spectrum is often subdivided into smaller sections because sometimes only a limited region of the spectrum is of interest. Common subdivisions include, but are not limited to, NIR, short-wavelength infrared (SWIR), mid-wavelength infrared (MWIR) or intermediate infrared (IIR), long-wavelength infrared (LWIR), and far infrared (FIR). The NIR spectrum, for example, includes wavelengths from about 0.75 micrometers to 1.4 micrometers, which as noted above, is included within the IR spectrum range.

The field of view ("FOV") of device 102 may include objects 108a-c, including a bush 108a, a person 108b, and a tree 108c. The scene 100 may include an external light source 110 independent from the device 102. Example external light sources 110 may include a natural light source (e.g., the sun) or an artificial light source external from device 102. Reflected light 106a-c may represent paths of light reflected off of objects 108a-c, respectively. Emitted light 112a may represent paths of light emitted from external light source 110. Emitted light 112b may represent paths of a source light transmitted from optical transmitter 105.

As shown in FIG. 1, optical receiver 104 may include one or more focus pixels. Focus pixels will be described in further detail with reference to FIGS. 4A-4E. Optical receiver 104 may sense light (e.g., visible signals, IR signals, and/or NIR signals), for example via optics of device 102 not shown in this figure, and thus capture an image of the FOV of device 102 based on the sensed light. The light received by optical receiver 104 may include reflections of the source light transmitted via optical transmitter 105. The light received by optical receiver 104 may include light from external light source 110 and/or reflections of light from external light source 110. In other words, optical receiver 104 may absorb the emitted light from external light source 110 directly or after it reflects off of objects 108a-c within the FOV of device 102. In some embodiments, optical transmitter 105 may transmit source light 112b when device 102 is used to capture an image. In other embodiments, the optical transmitter 105 may provide constant or pulsed illumination for the duration of a sensing period of optical receiver 104. In some embodiments, optical receiver 104 and optical transmitter 105 may be two independent (e.g., separate) components that are configured to operate together. Optical receiver 104 may be configured to generate an image of the FOV based on the received light.

As with optical transmitter 105, external light source 110 may function independently of device 102 (for example, as a constantly illuminated source such as the sun) or may function dependent upon device 102 (for example, as an external flash device). For example, external light source 110 may include an exterior light that constantly emits emitted light 112a within the FOV of device 102 or in a portion of the FOV of device 102.

Device 102 may be capable of determining depth of a scene or depth of an object based on light received at optical receiver 104. The example embodiment of FIG. 1 shows optical receiver 104 receiving reflected light 106a-c from objects 108a-c within the FOV of device 102. As shown, objects 108a-c may be at various depths from device 102. However, in some embodiments, objects 108a-c may be at a single depth from device 102.

In some embodiments, device 102 and/or optical receiver 104 may include an optical filter. The optical filter may be disposed (e.g., placed) in front of one or more photodetectors of an image sensor included within optical receiver 104 such that reflections of the source light transmitted via optical transmitter 105 may be received at the optical filter prior to being received at the one or more photodetectors of the image sensor of optical receiver 104. As described above, in some embodiments where optical transmitter 105 transmits the source light in a narrowband, optical receiver 104 may be configured to receive the narrowband source light via a narrowband filter. The optical filter may be placed in front of optical receiver 104 (or anywhere between the front of optical receiver 104 and/or one or more photodetectors of the image sensor included within optical receiver 104) such that the optical filter may filter out (e.g., block) wavelengths of light that are not associated with the narrowband of wavelengths of the source light. In this manner, the optical filter may allow particular wavelengths of light to pass through the optical filter and thus be received at optical receiver 104.

The optical filter may include, but is not limited to, interference filters, dichroic filters, absorptive filters, monochromatic filters, infrared filters, ultraviolet filters, longpass filters, bandpass filters, shortpass filters, and other filters. Optical bandpass filters are typically configured to selectively transmit wavelengths within a certain range while rejecting wavelengths outside of that range. Narrow bandpass filters are typically configured to transmit a narrow region of the spectrum (e.g., a narrow region of the NIR or IR spectrum when using an IR or NIR narrow bandpass filter) while rejecting light outside of the narrow region of the spectrum (e.g., rejecting visible light if the narrow bandpass filter is an IR or NIR narrow bandpass filter). An example of a narrow bandpass filter (also referred to herein as narrowband filters) may include an infrared or near infrared bandpass filter that is configured to transmit infrared or near infrared wavelengths of light. By disposing the optical filter (e.g., a narrow bandpass filter, optical bandpass filter, or the like) in a location in front of one or more photodetectors of the image sensor of optical receiver 104, the optical filter may filter light (e.g., reject interference light while transmitting the source light and/or reflections of the source light) prior to the light entering the one or more photodetector regions of the optical receiver 104. For example, the optical filter may transmit light within a narrow wavelength range (e.g., allow the light to pass through), while rejecting light outside of the narrow wavelength range. The light, having been filtered by the optical filter, may then enter and be detected by the one or more photodetectors of optical receiver 104. In this manner, only light within a particular wavelength range (or more than one particular wavelength range) associated with the optical filter may be detected by optical receiver 104 via the optical filter (e.g., narrow bandpass filter, optical bandpass filter, or the like), such as NIR and/or IR light.

While not shown in FIG. 1, device 102 may include one or more additional optical sensors to capture monochromatic and/or color images of the FOV. The one or more additional optical sensors to capture monochromatic and/or color images of the FOV may be separate from optical receiver 104. Alternatively, one or more photodetectors of optical receiver 104 may be used to capture monochromatic and/or color images of the FOV.

As discussed above, device 102 may be capable of determining depth (e.g., generating depth data and/or a depth map) of a scene or depth of an object based on light received at optical receiver 104. Device 102 may include one or more active depth sensing systems. Active depth sensing systems may include, but are not limited to, structured light systems, time-of-flight systems, and/or the like.

An active depth system may include a projector (e.g., transmitter 105) and a receiver (e.g., optical receiver 104). The projector may be configured to transmit a source light onto a scene. The source light may include infrared light. The source light may include a pattern. The pattern may be a known pattern. The pattern may include a structured pattern. The pattern may include a flood pattern. The pattern of the source light may change and/or update for different projections at different times and/or the pattern of the source light may stay the same for one or more different projections at different times.

In some examples, the projector (e.g., transmitter 105) may project a flood light. In other examples, a separate flood illuminator (not shown) may be included within device 102 or other devices disclosed herein to project the flood light. The projected flood light may include IR or NIR light. The sensor (e.g., receiver 104) may receive reflections of the flood light off of objects within the scene. The sensor may generate a 2-dimensional (2D) image based on the received reflections. In examples of the sensor including focus pixels, the 2D image may be generated by one or more pixels of the sensor, including the focus pixels. This improves imaging in low-light environments and increases positive face recognition and face authentication.

Figure 2:
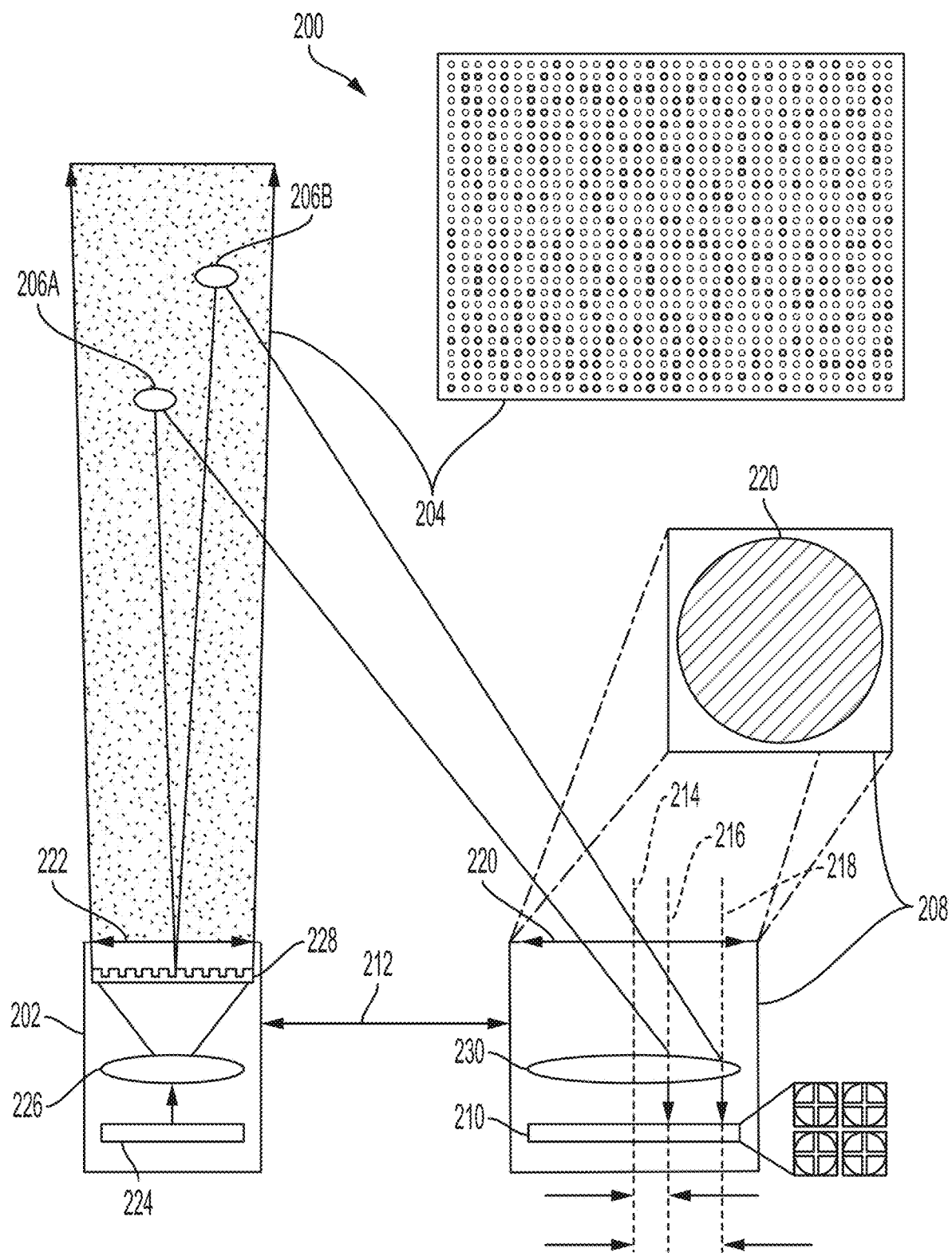
FIG. 2 is a depiction of an example structured light system.

FIG. 2 is a depiction of an example structured light system 200. The structured light system 200 may be used to generate depth data and/or a depth map (not pictured) of a scene (with objects 206A and 206B at different depths in the scene) or may be used for other applications for ranging of objects 206A and 206B or other portions of the scene. The structured light system 200 may include a transmitter 202 and a receiver 208. The transmitter 302 may be referred to as a "transmitter," "projector," "emitter," and so on, and should not be limited to a specific transmission component. Similarly, the receiver 308 may be referred to as a "detector," "sensor," "sensing element," "photodetector," and so on, and should not be limited to a specific receiving component.

The transmitter 202 may be configured to project a spatial distribution 204 onto the scene (including objects 206A and 206B). In some example implementations, the transmitter 202 may include one or more light sources 224 (such as laser sources), a lens 226, and a light modulator 228. In some embodiments, the light modulator 228 may include one or more diffractive optical elements (DOEs) to diffract the emissions from one or more light sources 224 (which may be directed by the lens 226 to the light modulator 228) into additional emissions. The light modulator 228 may also adjust the intensity of the emissions. Additionally or alternatively, the lights sources 224 may be configured to adjust the intensity of the emissions.

In some examples of the transmitter 202, a DOE may be coupled directly to a light source (without lens 226) and may be configured to diffuse the emitted light from the light source into at least a portion of the spatial distribution 204. The spatial distribution 204 may be a fixed distribution of emitted light that the projector transmits onto a scene. For example, a code mask may be encoded by the DOE, such that when light from the light source 224 is projected through the DOE, a codeword pattern (e.g., also known as a structured pattern) image is projected from projector and/or transmitter 202. The codeword pattern may include uniquely identifiable spatially-coded codewords defined by a plurality of symbols. In an example, a DOE may be manufactured so that the black spots in the spatial distribution 204 correspond to locations in the DOE that prevent light from the light source 224 being emitted by the transmitter 202. In this manner, the spatial distribution 204 may be known in analyzing any reflections received by the receiver 208. The transmitter 202 may transmit the light in a spatial distribution through the aperture 222 of the transmitter 202 and onto the scene (including objects 206A and 206B).

In some examples, a plurality of different projected patterns may be available, where different patterns may be configured for different conditions (e.g., for objects at different distances, or different configurations between the transmitter 202 and receiver 208).

The receiver 208 may include an aperture 220 through which reflections of the emitted light (e.g., reflections of the light source) may pass, be directed by a lens 230 and hit a sensor 210. The sensor 210 may be configured to detect (or "sense"), from the scene, one or more reflections of the spatial distribution of light. As illustrated, the transmitter 202 may be positioned on the same reference plane as the receiver 208, and the transmitter 202 and the receiver 208 may be separated by a distance 212 called the "baseline." The sensor 210 may include the infrared PDAF sensor, as disclosed herein.

The sensor 210 may include an array of pixels and/or photodiodes (such as avalanche photodiodes) to measure or sense the reflections. The array may be coupled to a complementary metal-oxide semiconductor (CMOS) sensor including a number of pixels or regions corresponding to the number of photodiodes in the array. The plurality of electrical impulses generated by the array may trigger the corresponding pixels or regions of the CMOS sensor to provide measurements of the reflections sensed by the array. Alternatively, the sensor 210 may be a photosensitive CMOS sensor to sense or measure reflections including the reflected codeword distribution. The CMOS sensor logically may be divided into groups of pixels that correspond to a size of a bit or a size of a codeword (a patch of bits) of the spatial distribution 204. As shown in FIG. 2, sensor 210 may include one or more focus pixels. Focus pixels will be discussed with reference to FIGS. 4A-4E.

The reflections may include multiple reflections of the spatial distribution of light from different objects or portions of the scene at different depths (such as objects 206A and 206B). Based on the baseline 212, displacement and distortion of the sensed light in spatial distribution 204, and intensities of the reflections, the structured light system 200 may be used to determine one or more depths and locations of objects (such as objects 206A and 206B) from the structured light system 200. With triangulation based on the baseline and the distances, the structured light system 200 may be used to determine the differing distances between objects 206A and 206B. For example, if the portion of the spatial distribution 204 of the reflections from objects 206A and 206B received at sensor 210 are recognized or identified as the same, the distance between the location 216 where the light reflected from object 206B hits sensor 210 and the center 214 of sensor 210 is less than the distance between the location 218 where the light reflected from object 206A hits sensor 210 and the center 214 of sensor 210. A smaller distance may indicate that the object 206B is further from the transmitter 202 than object 206A. The calculations may further include determining displacement or distortion of the spatial distribution 204 to determine depths or distances.

Figure 3A:
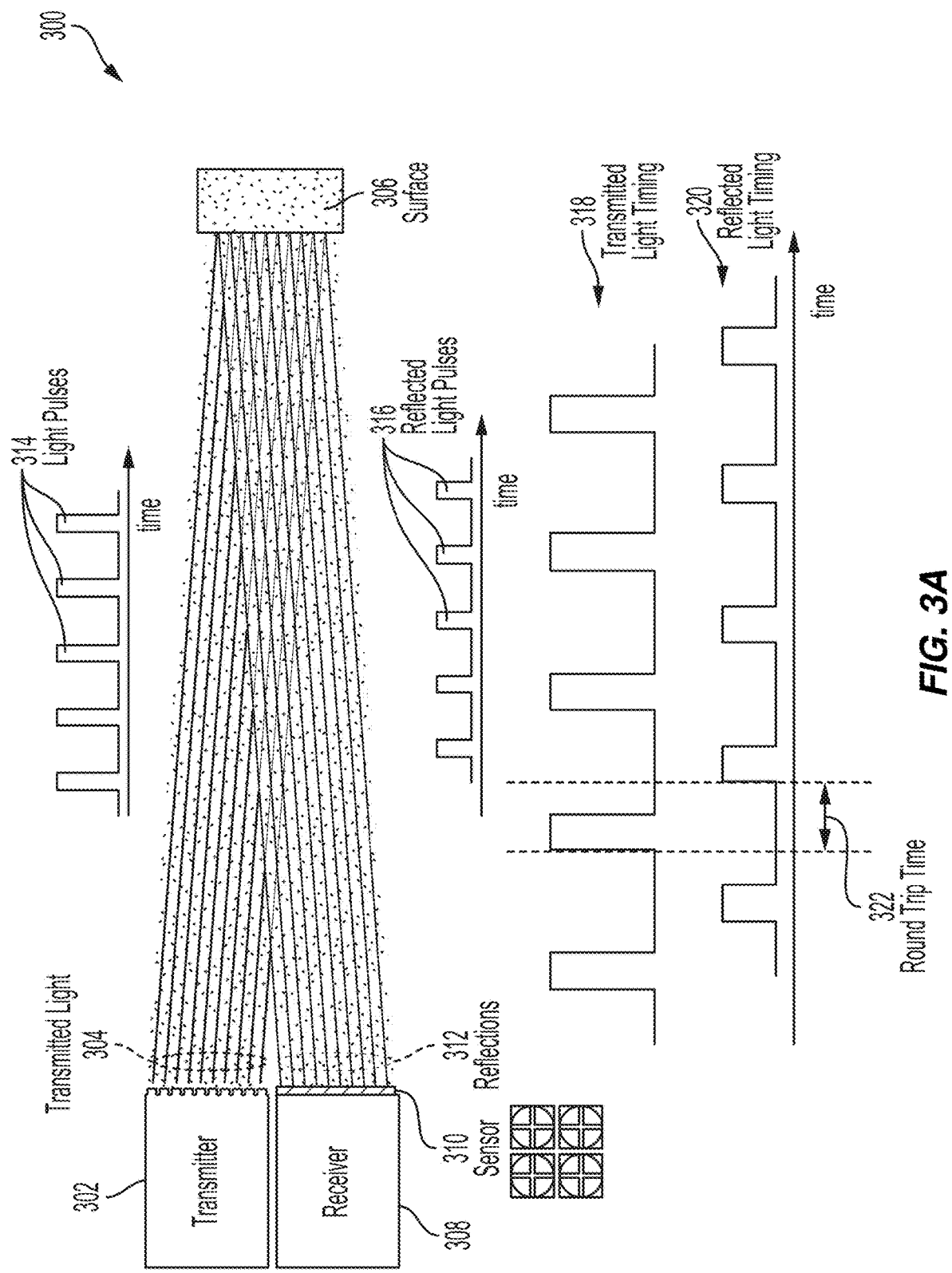
FIG. 3A is a depiction of an example time-of-flight (TOF) system.

FIG. 3A is a depiction of an example time-of-flight (TOF) system 300. The TOF system 300 may be used to generate depth data and/or a depth map (not pictured) of a scene (with surface 306 in the scene), or may be used for other applications for ranging surface 306 or other portions of the scene. The TOF system 300 may include a transmitter 302 and a receiver 308. The transmitter 302 may be referred to as a "transmitter," "projector," "emitter," and so on, and should not be limited to a specific transmission component. Similarly, the receiver 308 may be referred to as a "detector," "sensor," "sensing element," "photodetector," and so on, and should not be limited to a specific receiving component.

The transmitter 302 may be configured to transmit, emit, or project signals (such as a field of light, which may include a flood pattern, also referred to as the source light) onto the scene (including surface 306). While TOF systems are described in the examples as emitting light (which may include NIR), signals at other frequencies may be used, such as microwaves, radio frequency signals, sound, and so on. The present disclosure should not be limited to a specific range of frequencies for the emitted signals.

The transmitter 302 transmits light 304 toward a scene. While the transmitted light 304 is illustrated as being directed to surface 306, the field of the emission or transmission by the transmitter extends beyond as depicted for the transmitted light 304. For example, conventional TOF system transmitters may have a fixed focal length lens for the emission that defines the field of the transmission from the transmitter 302. The fixed field of the transmission for a conventional TOF system is larger at a depth from the transmitter than the fixed field of transmissions for each point of the spatial distribution for a conventional structured light system. As a result, conventional structured light systems may have longer effective ranges than conventional TOF systems.

The transmitted light 304 includes light pulses 314 at known time intervals (such as periodically). The receiver 308 includes a sensor 310 to sense and/or receive the reflections 312 of the transmitted light 304. The sensor 310 may include the infrared PDAF sensor disclosed herein. The reflections 312 include the reflected light pulses 316, and the TOF system determines a round trip time 322 for the light by comparing the timing 318 of the transmitted light pulses to the timing 320 of the reflected light pulses. The distance of the surface 306 from the TOF system may be calculated to be half the round trip time multiplied by the speed of the emissions (such as the speed of light for light emissions).

The sensor 310 may include an array of pixels and/or photodiodes to measure or sense the reflections. In some examples, the sensor 310 may include a CMOS sensor or other suitable photo-sensitive sensor including a number of pixels or regions for sensing. As shown in FIG. 3A, sensor 310 may include one or more focus pixels. Focus pixels will be discussed with reference to FIGS. 4A-4E. The TOF system 300 identifies the reflected light pulses 316 as sensed by the sensor 210 when the magnitudes of the pulses are greater than a threshold. For example, the TOF system measures a magnitude of the ambient light and other interference without the signal, and then determines if further measurements are greater than the previous measurement by a threshold. However, the noise or the degradation of the signal before sensing may cause the signal-to-noise ratio (SNR) to be too great for the sensor to accurately sense the reflected light pulses 316.

To reduce interference, the receiver 308 may include a bandpass filter before the sensor 310 to filter some of the incoming light at different wavelengths than the transmitted light 304. There is still noise sensed by the sensor, though, and the SNR increases as the signal strength of the reflections 312 decreases (such as the surface 306 moving further from the TOF system 300, or the reflectivity of the surface 306 decreasing). The TOF system 300 may also increase the power for the transmitter 302 to increase the intensity of the transmitted light 304. However, many devices have power constraints (such as smartphones, tablets, or other battery devices), and are limited in increasing the intensity of the emitted light in a fixed field for a TOF system.

As discussed above and referring back to FIG. 1, in some embodiments, optical transmitter 105 (e.g., transmitter 202 of FIG. 2 and/or transmitter 302 of FIG. 3A) may be configured to transmit a narrowband source light (e.g., infrared or near infrared light). In scenarios where device 102 may be used outdoors, such as the example scene of FIG. 1, light from the sun may result in a lower than ideal signal to noise ratio, which can render outdoor operation impractical. This sunlight (which may be referred to as interference or out of band leakage because it is not associated with and/or part of the source light which optical receiver 104 is configured to receive/capture) received at optical receiver 104 (e.g., receiver 208 of FIG. 2 and/or receiver 308 of FIG. 3A) may result in noise, artifacts, oversaturation, and/or other imperfections of the resulting captured image. The traditional solution to filter out sunlight and/or interference light (e.g., light that is not associated with the source light transmitted via optical transmitter 105 and/or light that is not associated with light intended to be captured by device 102) from being received at optical receiver 104 includes disposing (e.g., placing) a narrow bandpass filter in front of/before optical receiver 104 and/or one or more photodetectors of optical receiver 104 such that the sunlight and/or interference light not associated with the source light and/or light intended to be captured by device 102 may be filtered out prior to the light being received at optical receiver 104. However, the quality of the resulting image captured by device 102 (e.g., the depth data or depth map) depends upon the narrow bandpass filter rejecting as much of the interference light as possible and transmitting as much of the source light/intended light to be captured as possible. As such, this is not always possible in bright outdoor scenes. In order to generate improved depth maps, an infrared phase detection autofocus (PDAF) sensor is discussed below.

As discussed above, optical receiver 104 may include an optical sensor or image sensor that receives light, such as infrared (IR) light. The same optical receiver 104 that receives reflections of the source light off of objects within the scene (e.g., FOV) may be referred to herein as an infrared phase detection autofocus (PDAF) sensor. The infrared PDAF sensor may include a plurality of pixels, also known as a pixel array. Each of the plurality of pixels may include one or more photodiodes (also referred to herein as diodes). The plurality of pixels may include a first set of pixels including focus pixels and a second set of pixels including a narrowband filter. Focus pixels may also be referred to as phase detection pixels or phase detection autofocus pixels.

There are many different types of focus pixel patterns and/or arrangements that may be included within an image sensor, including optical receiver 104 (e.g., receiver 208 and/or 308 of FIGS. 2 and 3 respectively) as one example. For example, focus pixels may include masks to limit the amount and direction of light that strikes focus pixel diodes, focus pixels may include dual photodiode (2PD) pixels where each 2PD focus pixel includes two diodes, focus pixels may include an on-chip lens (OCL) such as a micro-lens, which may limit the amount and direction of light that strikes focus pixel diodes.

Focus pixels may include masks to limit the amount and direction of light that strikes focus pixel diodes. Referring to FIG. 4A, some image sensors (e.g., pixel array 400) may include one or more focus pixels (e.g., pixel locations with masks 402a, 402b) which have been masked to limit light to strike the diode of the focus pixel from a particular direction. Masks 402a and 402b may be disposed over two different focus pixel diodes in an opposite direction to produce a pair of left and right images (e.g., focus pixel diodes may receive 50% of light due to the half-apertures created by masks 402a and 402b). While only one pair of focus pixels is shown in FIG. 4A, this is for exemplary purposes only. Any number of focus pixels may be included in an image sensor. Left and right pairs of focus pixels may be adjacent to one another or may be spaced apart by one or more imaging diodes 404 (e.g., imaging pixels that are not masked). Left and right pairs of focus pixels may be in the same row or column or in different rows or columns. As shown in FIG. 4A, focus pixels with masks 402a and 402b are located in the same column, but in a different row, and are spaced apart by imaging pixels 404 that do not include masks (e.g., the imaging diodes of imaging pixels 304 that do not include masks receive 100% of light). This is shown for exemplary purposes only and is not meant to be a limitation of this disclosure. While masks 402a and 402b are shown within pixel array 400 as masking left and right portions of the focus pixel diodes, this is for exemplary purposes only. Focus pixel masks may mask top and bottom portions of the focus pixel diodes, thus generating up and down (or top and bottom) pairs of images.

Focus pixels may include dual photodiode (2PD) pixels where each focus pixel includes two diodes, a first photodiode and a second photodiode adjacent to the first photodiode. Referring to FIG. 4B, some image sensors (e.g., pixel array 410) may include one or more 2PD pixels, such as 2PD pixel 412 including a left diode 412L and a right diode 412R. Left diode 412L may generate a left image and right diode 412R may generate a right image. While each pixel within pixel array 410 is shown to include 2PD focus pixels, this is for exemplary purposes only. The focus pixels (e.g., 2PD pixels) may be sparse, such that only a subset of pixels included within the pixel array of an image sensor are 2PD focus pixels arranged in any manner (e.g., adjacent to one another, spaced apart from one another, etc.), while the remaining pixels are imaging pixels including a single diode. Also, while all of the 2PD focus pixels of FIG. 4B are shown as left and right pairs, this is for exemplary purposes only. Other configurations of 2PD focus pixels may include top and bottom pairs (e.g., up and down pairs) and/or an assortment of left and right pairs and top and bottom pairs in a single image sensor.

Referring to FIG. 4C, focus pixels of pixel array 420 may include 4PD pixels where each focus pixel 422 includes four diodes (also referred to as QPD). As shown in FIG. 4C, focus pixel 422 includes four diodes 422a, 422b, 422c, and 422d. In this manner, 4PD focus pixel diodes may generate two pairs of images: a left and right pair (e.g., the left based on focus pixels 422a and 422c and the right based on focus pixels 422b and 422d) and an up and down (e.g., top and bottom) pair (e.g., the up based on focus pixels 422a and 422b and the down based on focus pixels 422c and 422d). While each pixel within pixel array 420 is shown to include 4PD focus pixels, this is for exemplary purposes only. The focus pixels (e.g., 4PD pixels) may be sparse, such that only a subset of pixels included within the pixel array of an image sensor are 4PD focus pixels arranged in any manner (e.g., adjacent to one another, spaced apart from one another, etc.), while the remaining pixels are imaging pixels including a single diode. In other sensor arrangements, a single pixel array may include some focus pixels that are 2PD pixels while other focus pixels are 4PD pixels.

Focus pixels may include an on-chip lens (OCL) such as a micro-lens, which may limit the amount and direction of light that strikes focus pixel diodes. Referring to FIGS. 4D and 4E, some image sensors (e.g., pixel arrays 430 and 440) may include one or more on-chip lenses (e.g., on-chip lenses 432 and 442). The on-chip lens may span a number of adjacent pixels/diodes, such that a pair of images may be generated. For example, OCL 432 spans 4 pixels/diodes (e.g., a 2×2 OCL), such that two pairs of images may be generated: a left and right pair and an up and down (e.g., top and bottom) pair. Similarly, OCL 442 spans 2 pixels/diodes (e.g., a 2×1 OCL), such that a pair of left and right images may be generated. While OCL 442 is shown within pixel array 440 as spanning left and right adjacent pixels/diodes (e.g., in a horizontal direction), this is for exemplary purposes only. On-chip lens may span top and bottom adjacent pixels/diodes (e.g., in a vertical direction), thus generating an up and down (or top and bottom) pair of images. Any number of focus pixels may be included within the pixel array and a mix of OCLs spanning 4 pixels/diodes and/or 2 pixels/diodes may be included.

Any example configuration of focus pixels shown in FIGS. 4A-4E or any other configuration may be included within the infrared PDAF sensor. That is, any configuration of focus pixels may be included within the sensor/receiver of the active depth system. For example, any configuration of focus pixels may be included within sensor/receiver 210 of structured light system 200 of FIG. 2. Alternatively, or in addition to, any configuration of focus pixels may be included within sensor/receiver 310 of TOF system 300 of FIG. 3A.

Figure 3B:
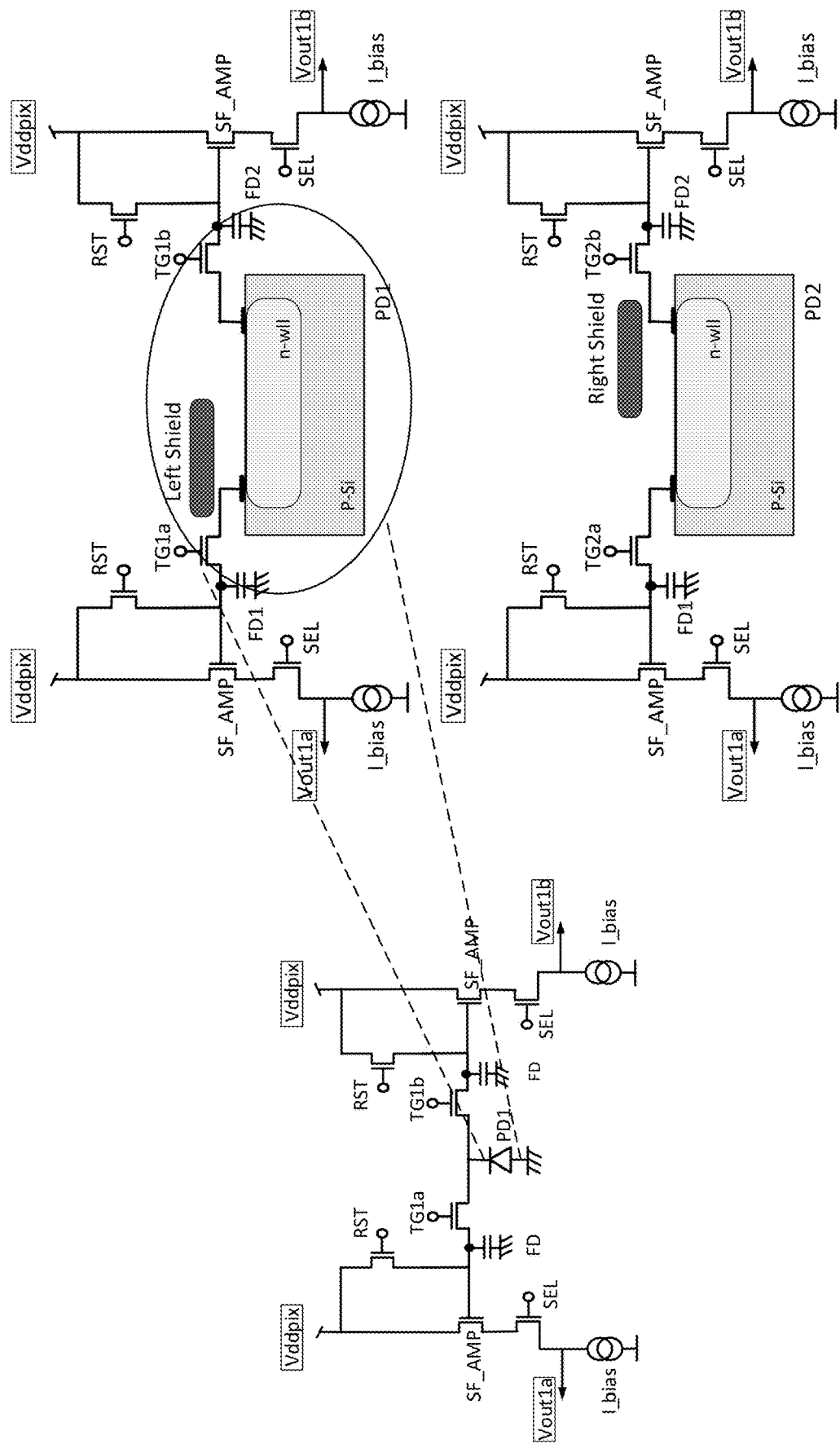
FIG. 3B-3D depict circuits of example TOF demodulation pixels with example PDAF architectures.

FIG. 3B depicts an equivalent circuit of a TOF demodulation pixel with example PDAF architecture. A plurality of TOF demodulation pixels may be included within the sensor 310 of FIG. 3A. The PDAF architecture depicted in FIG. 3B may include masks (e.g., Left Shield and/or Right Shield), as shown and described with reference to FIG. 4A, or 2PD pixels as shown and described with reference to FIG. 4B. Dual transfer gates, TG1a and TG1b, are incorporated for increasing the charge transfer speed. In this time division pixel design scheme, the dual transfer gates (e.g., TG1a and TG1b) decrease travel distance of photo-generated electrons from photodiode (PD1 and/or PD2) to floating diffusion (FD) nodes (e.g., FD1 and/or FD2), resulting in fast charge transfer. The pixel may also include some functional transistors including a reset transistor (RST), a source follower amplifier (SF_AMP), and a pixel select transistor (SEL).

Figure 3C:
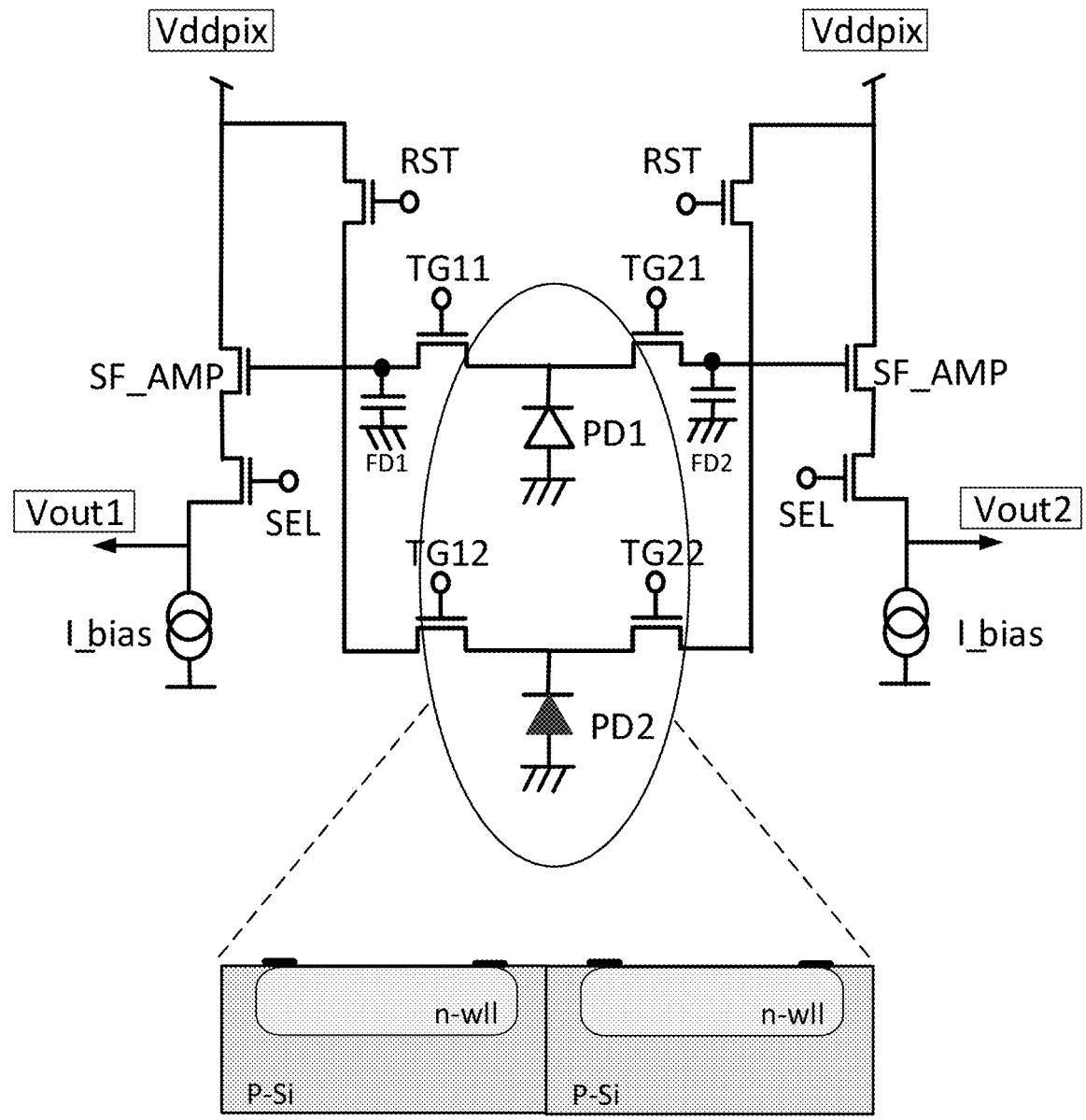

FIG. 3C depicts another example circuit of a TOF demodulation pixel with an example PDAF architecture. A plurality of the TOF demodulation pixels may be included within the sensor 310 of FIG. 3A. The PDAF architecture depicted in FIG. 3C may include an OCL that spans 2 pixels/diodes (e.g., left and right and/or up and down), as shown and described with reference to FIG. 4E.

Figure 3D:
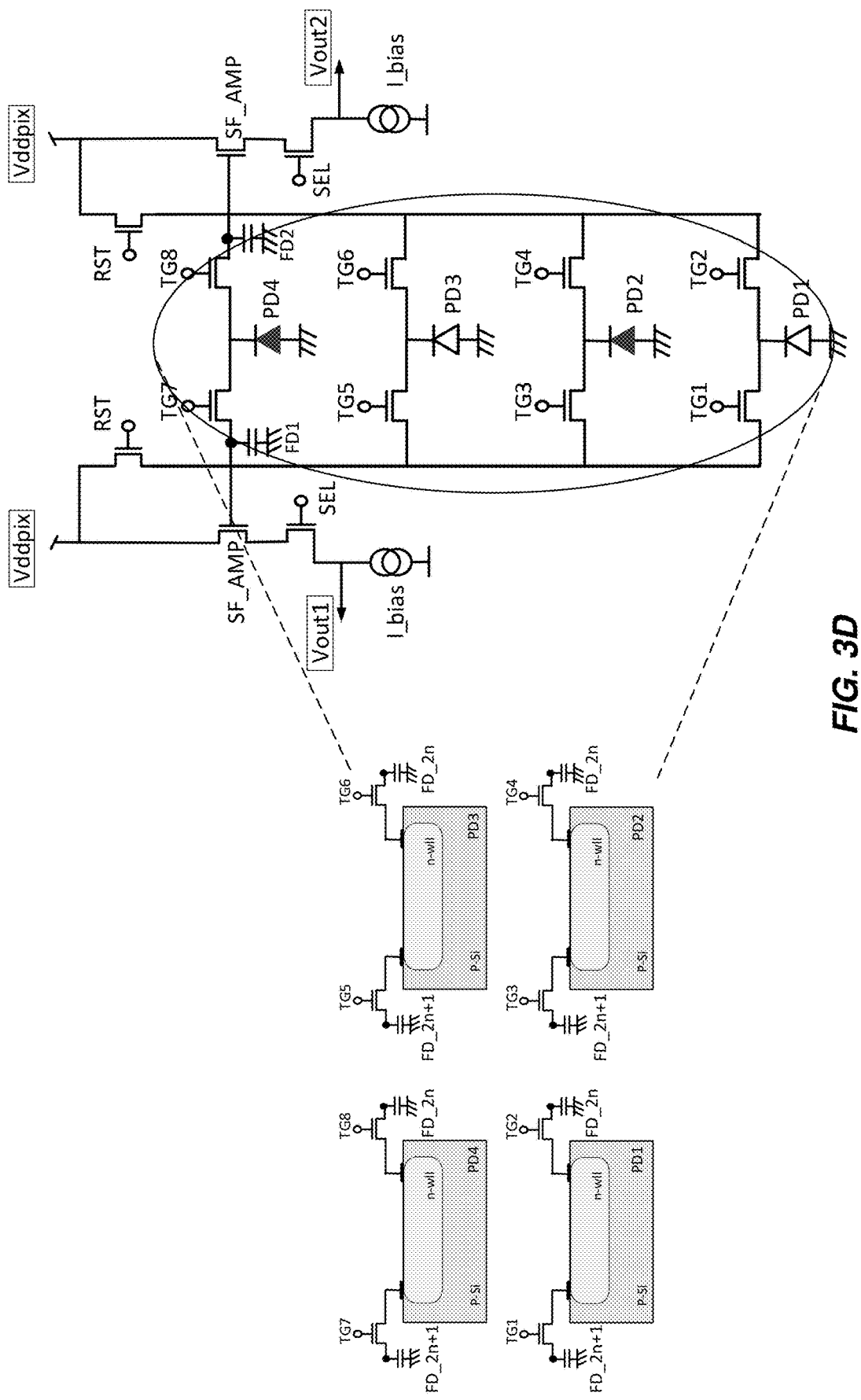

FIG. 3D depicts another example circuit of a TOF demodulation pixel with an example PDAF architecture. A plurality of TOF pixels may be included within the sensor 310 of FIG. 3A. The architecture depicted in FIG. 3D may include an OCL that spans 4 pixels/diodes (e.g., left, right, top, and bottom), as shown and described with reference to FIG. 4D. The 4×1 shared pixel cell with dual-transfer gate and storage nodes depicted in FIG. 3B results in fast charge transfer. The floating diffusion (FD_2n, FD2n+1, FD1, and/or FD2) nodes serve as storage nodes. This enables alternate readout modes of structured light (SL) and/or TOF depth sensing frames.

In the SL imaging mode, the pixel operation is similar to a 4T active pixel with shared amplifier architecture in rolling shutter fashion. A 4T pixel sensor is an active pixel sensor where each pixel sensor unit cell has a photodetector and one or more active transistors. The 4T pixel cell mainly consists of a transfer gate, a reset gate, a row selection fate, and a source follower (Amplifier) input transistor connected to the photodetector. During NIR rolling shutter imaging mode for SL sensing, only one of the dual transfer gates in the pixel may be activated. When pixels in the nth row are read out, only two transfer gates, TG1 and TG4, may be activated after FD1 and FD2 nodes are reset. When pixels in n+1 row are accessed, TG5 and TG8 are turned on. During this time, the other 4 transfer gates (TG2, TG3, TG6, and TG7) are always turned off. This operation allows all pixels in the same row to be readout at once.

When operated in the TOF mode, all the transfer gates are turned on and off synchronously with the emitter signal in the depth image mode. The phase difference between the emitted and reflected lights and a half of the period of the modulated signal are shown in FIG. 3E.

Figure 3E:
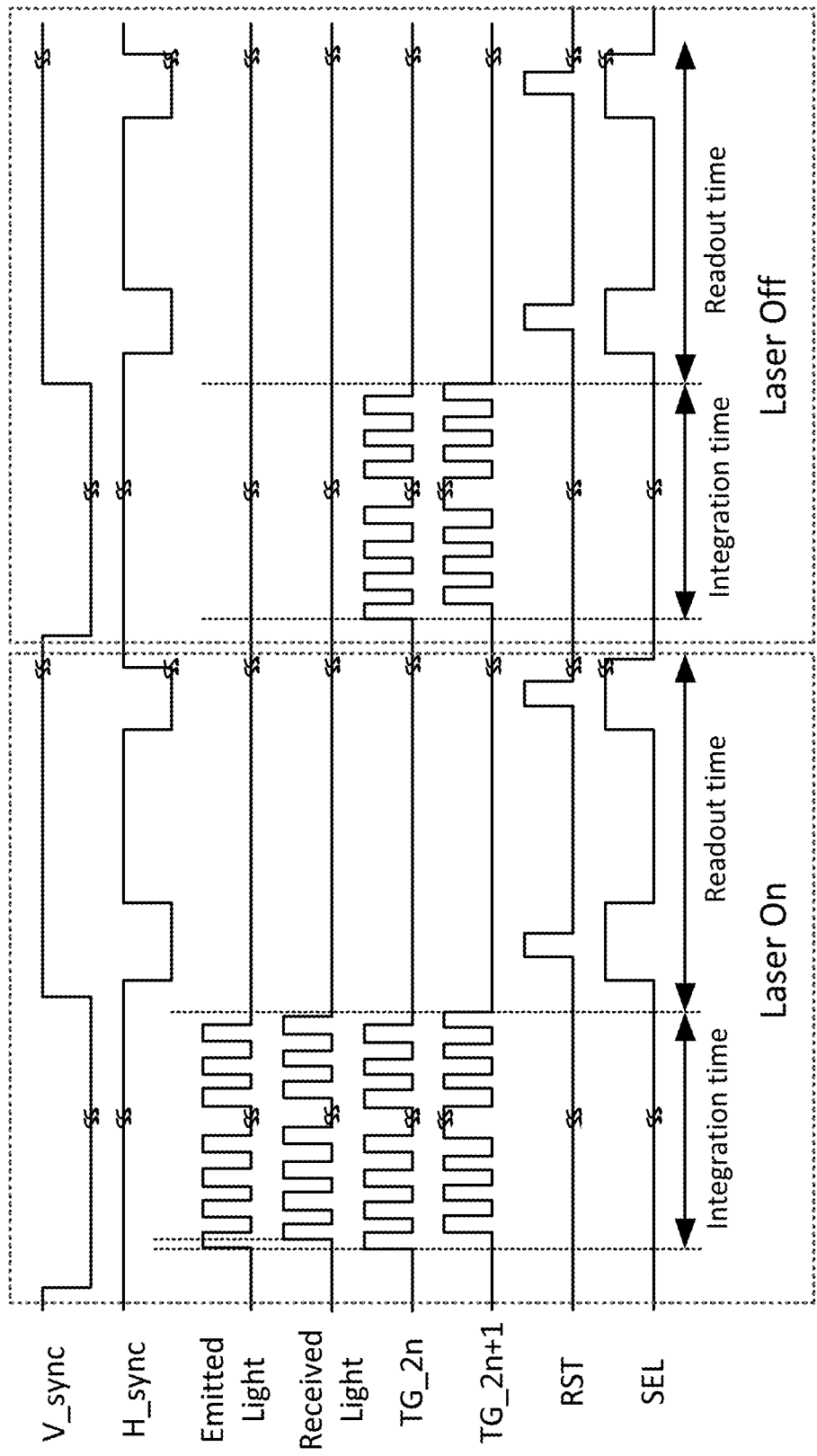
FIG. 3E depicts a timing diagram of demodulating TOF signals.

FIG. 3E depicts a timing diagram of demodulating TOF signals. When operated in TOF mode, all pixels and the transmitter 302 of FIG. 3A operate globally during the integration time period, while other control signals of the sensor 310 are not applied at all. When TG_2n transfer gates (e.g., TG2, TG4, TG6, and TG8) and transmitter 302 are activated, TG_2n+1 transfer gates (e.g., TG1, TG3, TG5, and TG7) are de-activated, electrons generated by the reflected light are swept from the PD to the FD_2n node (e.g., FD2 from FIG. 3D). The number of electrons is proportional to the overlapping duration of TG_2n and reflected light signals, which is called the in-phase raw signal, $S_0$. Next, TG_2n+1 transfer gates are turned on, and the other gates are off, transferring the generated electrons to the FD_2n+1 node (e.g., FD1 from FIG. 3D). These electrons are contributed to the out-of-phase raw signal, $S_{180}$. After the integration period, the readout operation follows, both FD nodes serve as storage nodes, and the TG gates are turned off. It allows readout operation with the rolling shutter fashion that extracts accumulated signal charges first and reads the reset values later. Background light cancellation is performed with an additional frame captured without activation of the transmitter 302. A dark offset signal is subtracted from both phases of raw signals, $S_0$ and $S_{180}$, when the depth data and/or depth map is computed.

Once light has been received at the focus pixels, the signals (e.g., signals from paired focus pixels, such as left and right focus pixels or up and down focus pixels) may be compared with one another. For example, phase differences between signals generated from the left focus pixel and the right focus pixel may be compared and a separation error (e.g., a disparity) between the signals may be determined. The disparity between the left and right images associated with the focus pixel may be the defocus value for that focus pixel.

Depth data may be generated based on the disparity information determined based on the one or more focus pixels. If the image sensor is a dense 2PD sensor, such that each pixel is a 2PD focus pixel, each pixel may be associated with a defocus value. For a 12 megapixel sensor, that may be a lot of data to process to determine the defocus value for each pixel. The disparity information (e.g., the defocus value for each focus pixel) may be determined using a neural network. Alternatively, the disparity information (e.g., the defocus values) may be determined for groups or regions of pixels in order to downscale the amount of data to process. For example, disparity data may be determined for a group of 20×20 pixels, or any other number of pixels. The more disparity information associated with the frame, the more accurate the depth data.

Depth data based on the focus pixels may be determined based on the disparity information. As will be discussed with reference to FIG. 5, using well known techniques, the depth data may be determined based on the disparity.

As depicted in FIGS. 4A-4E, the plurality of pixels of pixel arrays 400, 410, 420, 430, and 440 are not shown to include filters. For traditional image sensors used to capture color images, one or more color filters may be disposed above one or more pixels such that light received at the sensor strikes the color filter to allow only particular wavelengths of light to strike the photodiode of the pixel. In the example of the infrared PDAF sensor, one or more narrowband filters may be disposed above one or more pixels such that light received at the sensor strikes the narrowband filter to allow only particular wavelengths of light to strike the photodiode of the pixel. In this example, the one or more narrowband filters may allow wavelengths of the source light (e.g., infrared or near-infrared light) to strike the one or more photodiodes.

Figure 8:
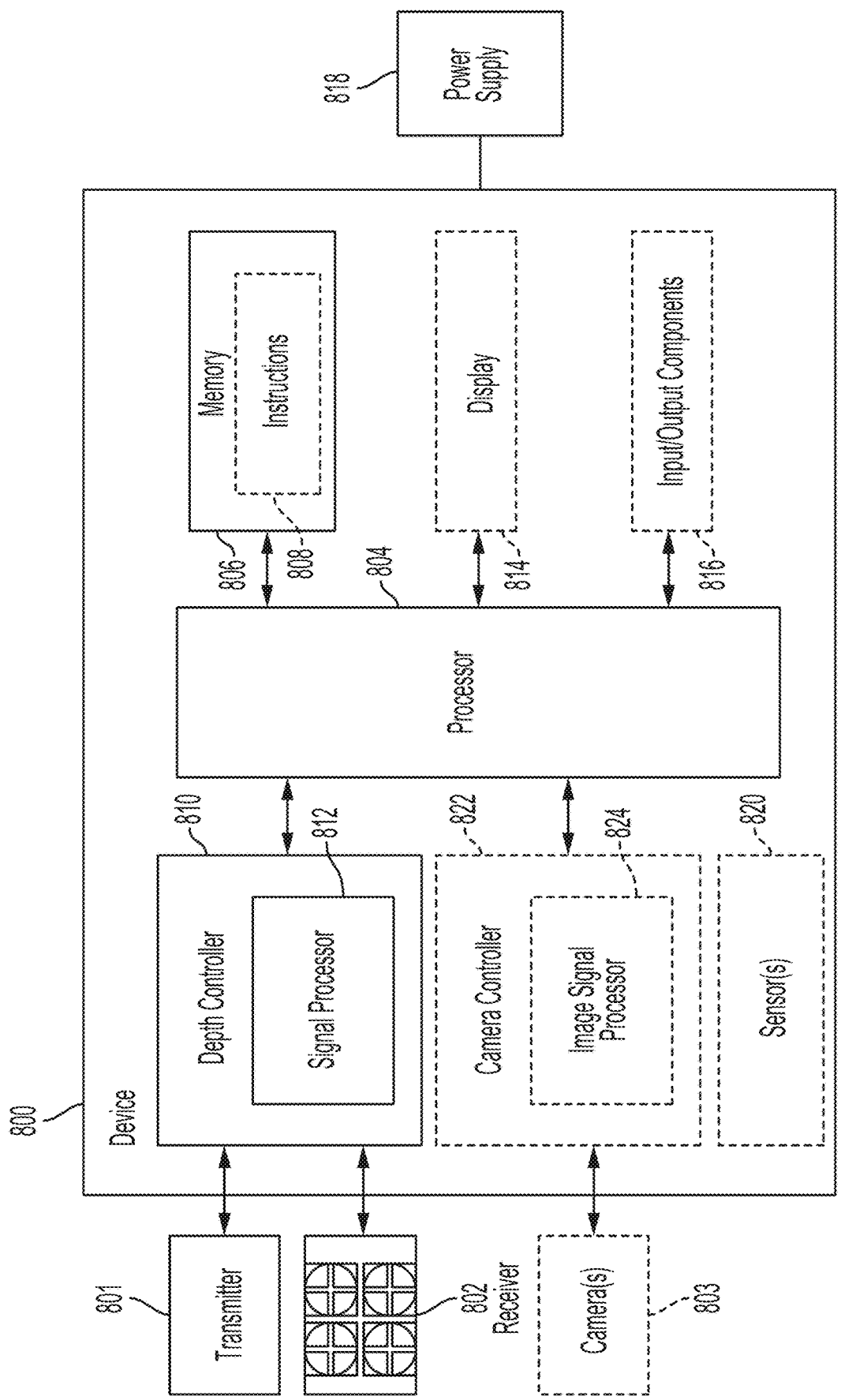
FIG. 8 is a block diagram of an example device including a depth sensing system.

The infrared PDAF sensor may include one or more narrowband filters. A single narrowband filter may be disposed above the entire infrared PDAF sensor such that light strikes the single narrowband filter prior to striking any of the photodiodes of the infrared PDAF sensor. In some examples, a single narrowband filter may be disposed upon a portion of the infrared PDAF sensor such that some light strikes the single narrowband filter prior to striking the photodiodes of the infrared PDAF sensor below the single narrowband filter, while other photodiodes of the infrared PDAF sensor may receive all light (e.g., all wavelengths of light) due to the lack of a narrowband filter disposed above a portion of the infrared PDAF sensor. In some examples, a narrowband filter may be disposed above each and every pixel of the pixel array of the infrared PDAF sensor such that light strikes each narrowband filter prior to striking each of the photodiodes of the infrared PDAF sensor. In some examples, a narrowband filter may be disposed above a subset of pixels (e.g., a second set of pixels) such that light strikes the narrowband filter above the subset of pixels prior to striking any of the photodiodes of the subset of pixels of the infrared PDAF sensor, while other photodiodes of the infrared PDAF sensor may receive all light (e.g., all wavelengths of light) due to the lack of a narrowband filter disposed above the remaining pixels of the infrared PDAF sensor. In some examples of the infrared PDAF sensor, some of the focus pixels (e.g., a first set of pixels including the focus pixels) may each include a narrowband filter in addition to one or more imaging pixels each including a narrowband filter. In some examples of the single narrowband filter, the single narrowband filter may be mechanically controlled to move above the infrared PDAF sensor and/or move away from the infrared PDAF sensor such that light no longer strikes the single narrowband filter prior to striking the photodiodes of the infrared PDAF sensor. The filter may be automatically controlled based on time of day, ambient lighting conditions, user preferences, user input, etc. For example, a processor of the device, as shown in FIG. 8, may output instructions to move one or more filters above one or more pixels of the infrared PDAF sensor. In some examples, some of the pixels of the infrared PDAF sensor may include a color filter in addition to the narrowband filter and/or in lieu of the narrowband filter. In some examples, color filters may not be included in the infrared PDAF sensor, but rather included in a separate image sensor used to capture monochromatic and/or color images. The narrowband filter may be disposed in front of or above a lens of optical receiver 104, behind or below the lens of optical receiver 104, or any other location such that the light received at optical receiver 104 is filtered prior to the light (e.g., reflections of the source light) being received at the photodetector of the image sensor of optical receiver 104.

The one or more focus pixels of the infrared PDAF sensor may receive particular wavelengths of light based on the filter (or lack of filter) disposed above the one or more focus pixels and generate depth data based on the received wavelengths of light. For example, if no filter is disposed above the one or more focus pixels, the one or more focus pixels may receive all of the light, including received reflections of the source light and any ambient light. Alternatively, if one or more filters is disposed above the one or more focus pixels, the one or more focus pixels may receive any light that passes through the one or more filters (e.g., IR or NIR, ambient light, etc.). Depth data may then be generated based on the received light at the one or more focus pixels, as discussed above.

Device 100 of FIG. 1 may determine a first set of confidence values associated with the first depth data. The first depth data may be generated based on an active depth system, such as a structured light system, a TOF system, or the like. The first depth data may include a first depth map. A depth map may be an image containing information about the distance from the device 100 (e.g., the sensor of the device 100) to surfaces of objects within a scene. In some examples, the first set of confidence values may be determined based on comparing depth data of a first pixel location (e.g., a depth value) to depth data of one or more neighboring pixels from the first pixel location. For example, while differences in depth values may be prevalent along object borders in contrast to neighboring pixels of foreground and/or background, a single pixel variance within a neighborhood of pixels with similar depth values may be associated with a lower confidence value than the confidence values associated with the neighboring pixels. In some examples, the first set of confidence values may be determined based on spatial code gaps (e.g., outages) at one or more pixel locations within the first depth map. In some examples, the first set of confidence values may be determined based on distortions in received codewords and/or patterns. For example, if portions of the received reflections of the codewords and/or patterns are distorted compared to expected codewords and/or patterns (e.g., based on previously stored data about the codewords and/or patterns), then those portions of the depth map may be associated with lower confidence values than other portions of the depth map. In some examples, the first set of confidence values may be determined based on ambient lighting conditions and/or metadata associated with the device (e.g., capturing a scene outdoors in daylight may indicate lower confidence associated with the first depth data due to noise, causing reduced SNR, as discussed above, than capturing a scene indoors or in low-light environments). In some examples, the first set of confidence values may be determined based on comparing the first depth data (e.g., the first depth map) based on the received reflections of the source light to previously stored data associated with the active depth system. In some examples, the first set of confidence values may be determined based on one or more combinations of the above examples. This is not meant to be a limitation of this disclosure, as any way to determine the first set of confidence values associated with the first depth data may be used.

A confidence score may be associated with one or more pixels of the first depth map. For example, each pixel in the first depth map be associated with a confidence score. Alternatively, a group of pixels (e.g., a neighborhood of pixels including any number of pixels such as 2×2, 4×4, 10×10, etc.) in the first depth map may be associated with a confidence score. The first depth map may include a combination of the above such that a single pixel of the first depth map may be associated with a single confidence score while a group of pixels, including or separate from the single pixel, may be associated with a confidence score. In some examples, a confidence score associated with a group of pixels may be an average of individual confidence values associated with the individual pixels included within the group of pixels.

Figure 5:
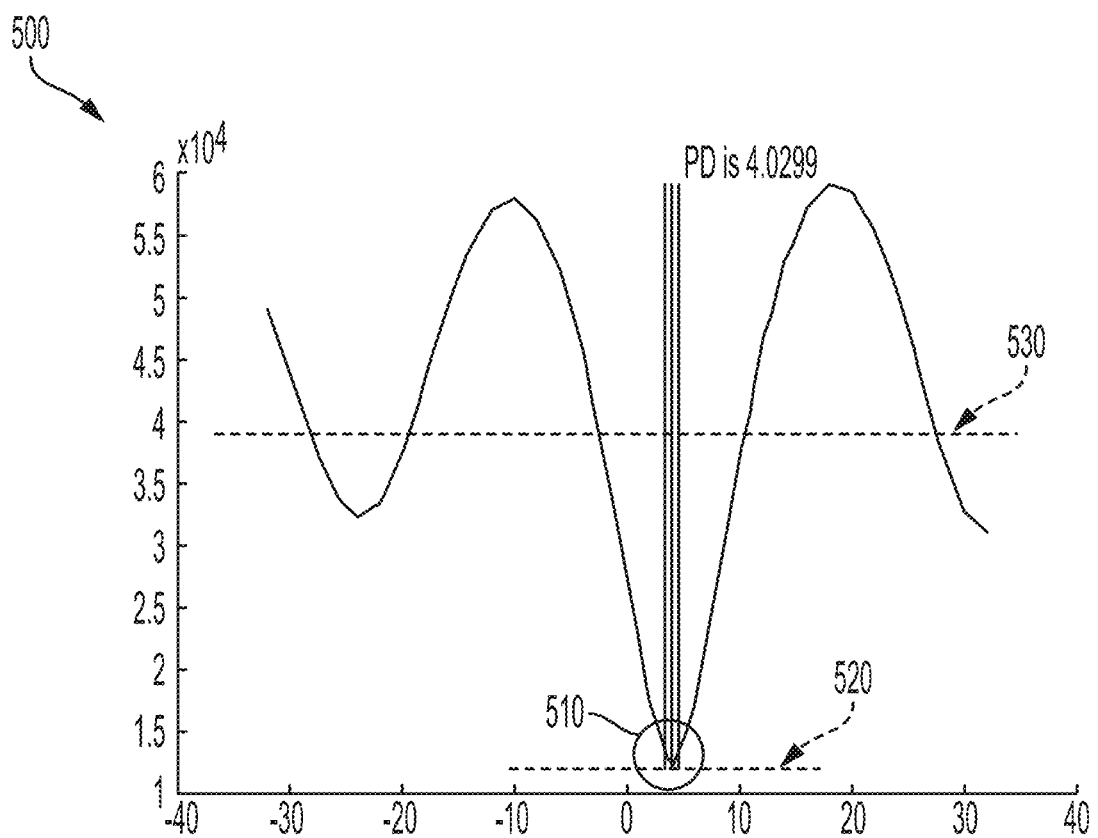
FIG. 5 depicts an example plot of a sum of absolute differences (SAD) metric.

Device 100 of FIG. 1 may determine a second set of confidence values associated with the second depth data. The second depth data may be generated based on the focus pixels of the infrared PDAF sensor. The infrared PDAF sensor may be the same receiver included within the active depth system. FIG. 5, depicts a plot 500 of an example sum of absolute differences (SAD) metric associated with focus pixels, with the SAD plotted (on the y-axis) versus the phase difference of the focus pixels (on the x-axis). The SAD metric may represent a sum of absolute differences between left and right focus pixels and/or up and down focus pixels. For example, the SAD metric may represent a sum of absolute differences between signals from a first set of focus pixels of an image sensor. The phase difference (on the x-axis) may correspond to a candidate distance to objects in the scene, and thus determining the distance to objects in the scene corresponds to determining the phase difference at which the SAD is minimized.

The phase difference corresponding to the smallest SAD ("minimum phase difference") may correspond to an estimate of the distance to or depth of objects in the scene based on the one or more focus pixels. More particularly, the minimum phase difference may correspond to the estimated disparity between signals from corresponding focus pixels (e.g., the disparity between signals from the left and the right focus pixels and/or up and down focus pixels), which, in combination with the known configuration of the sensor (e.g., the known locations of the focus pixels within the sensor), helps to provide the estimated depth. With respect to FIG. 5, the minimum value of the SAD in the plot 500 is depicted at 510 and occurs at a phase difference of just over 4. The minimum phase difference for the plot 500 in FIG. 5 is shown as "PD" approximately equaling 4.0299.

The SAD metric may be used to determine a second set of confidence values associated with the second depth data. A variety of techniques may be used for determining the second set of confidence values. In some examples, local properties of the SAD metric near the determined minimum phase difference may be used to determine one or more confidence values of the second set of confidence values. In one example, a determined minimum SAD from a SAD metric with large slopes near the minimum (thus producing a distinct minimum) may have a higher confidence value than a determined minimum SAD from a SAD metric with shallower slopes near the minimum. In one example, the confidence value may correspond to a ratio between the average value of the SAD metric over a range of phase differences and the determined minimum value of the SAD metric. Thus, the smaller the minimum value of the SAD metric relative to the average value, the more distinct the minimum, and the higher the confidence value. With respect to FIG. 5, such a confidence value may correspond to a ratio between average SAD value 530 and minimum SAD value 520.

In some examples, a SAD metric, a minimum phase difference, and a confidence value may be determined for each pixel within a second depth map associated with the second depth data. For example, each pixel may be associated with the estimated depth (corresponding to the determined minimum phase difference) and a corresponding confidence value for the determined minimum phase difference. Alternatively, a SAD metric, a minimum phase difference, and a confidence value may be determined for a group of pixels (e.g., a neighborhood of pixels including any number of pixels such as 2×2, 4×4, 10×10, etc.). The second depth map may include a combination of the above such that a single pixel of the second depth map may be associated with a single confidence score while a group of pixels, including or separate from the single pixel, may be associated with a confidence score. In some examples, a confidence score associated with a group of pixels may be an average of individual confidence values associated with the individual pixels included within the group of pixels.

Device 100 may generate combined depth data based on the first depth data and the second depth data. Generating combined depth data based on the first depth data and the second depth data may include combining a portion of the first depth data and a portion of the second depth data based upon the first set of confidence values associated with the first depth data and the second set of confidence values associated with the second depth data. For example, one or more depth values from the first depth data and one or more depth values from the second depth data may be selected to be included in the combined depth data. The one or more depth values from the first depth data and the second depth data may be selected based on the corresponding confidence values associated with the one or more depth values from the first depth data and the second depth data. In some example, the combined depth data may include a combined depth map.

Corresponding confidence values associated with depth values (e.g., corresponding to individual pixels or groups of pixels) may be compared between the first depth data and the second depth data. The depth value associated with the highest confidence value based on the comparison may be selected to be included in the combined depth data and/or combined depth map. The selected depth values may be selected for individual pixels and/or for groups of pixels. For example, a first confidence value associated with a first depth value (for an individual pixel or for a group of pixels) of the first set of confidence values associated with the first depth data may be compared to a corresponding second confidence value associated with a second depth value (for a corresponding individual pixel or for a corresponding group of pixels) of the second set of confidence values associated with the second depth data. Based on the comparison, a higher confidence value may be determined between the first confidence value and the second confidence value. A depth value associated with the higher confidence value may be selected to be included within the combined depth data and/or combined depth map. In other words, based on whichever depth value of the first depth map or the second depth map has the highest confidence value, either the first depth value of the first depth data or the second depth value of the second depth data may be included in the combined depth data and/or combined depth map for that corresponding pixel or group of pixels.

In another example, a proportional contribution of each of the depth values from the first depth data and the second depth data may be selected based on the first set of confidence values and the second set of confidence values. For example, the depth value for a corresponding pixel or group of pixels between the first depth data and the second depth data having a higher confidence value between the first depth data and the second depth data may be assigned a first weight while the lower confidence value between the first depth data and the second depth data may be assigned a second weight, such that the first weight is greater than the second weight. Both depth values, after being weighted, may then be represented within the combined depth data and/or the combined depth map for that pixel or group of pixels. For example, a first confidence value associated with a first depth value (for an individual pixel or for a group of pixels) of the first set of confidence values associated with the first depth data may be compared to a corresponding second confidence value associated with a second depth value (for a corresponding individual pixel or for a corresponding group of pixels) of the second set of confidence values associated with the second depth data. Based on the comparison, a higher confidence value and a lower confidence value may be determined between the first confidence value and the second confidence value. A first weight may be assigned to the first depth value and a second weight may be assigned to the second depth value. The first weight may be proportional to the first confidence value and the second weight may be proportional to the second confidence value. The first weighted depth value associated with the first depth data and the second weighted depth value associated with the second depth data may both be selected to be included within the combined depth data and/or combined depth map for that corresponding pixel. In order words, if the first depth data and the second depth data have similar confidence values at a given pixel or group of pixels, that pixel or group of pixels in the combined depth data and/or combined depth map may reflect similar contributions from each of the first depth data and the second depth data. In contrast, if the first depth data has a lower confidence value at a given pixel or group of pixels than the confidence value associated with the same pixel or group of pixels of the second depth data, the contribution of the depth value for the pixel or group of pixels of the first depth data may be less in the combined depth data and/or combined depth map.

In some examples, device 100 of FIG. 1 may optionally disable the active depth system. For example, device 100 may receive an input from a user to disable the active depth system. In another example, device 100 may determine when to disable the active depth system based on current lighting conditions and/or metadata. For example, if the scene is bright with sunlight, the active depth system may optionally be disabled. The active depth system may be disabled by turning off the transmitter/projector such that the source light is not transmitted onto the scene. In such cases, depth data may be generated based on the focus pixels of the infrared PDAF sensor.

In some examples, additional depth data may be generated based on focus pixels included within a separate sensor (e.g., an RGB sensor) and/or a separate stereo camera system. The additional depth data generated based on focus pixels included within a separate sensor (e.g., an RGB sensor) and/or a separate stereo camera system may be considered for combination into the combined depth data and/or combined depth map.

Figure 6:
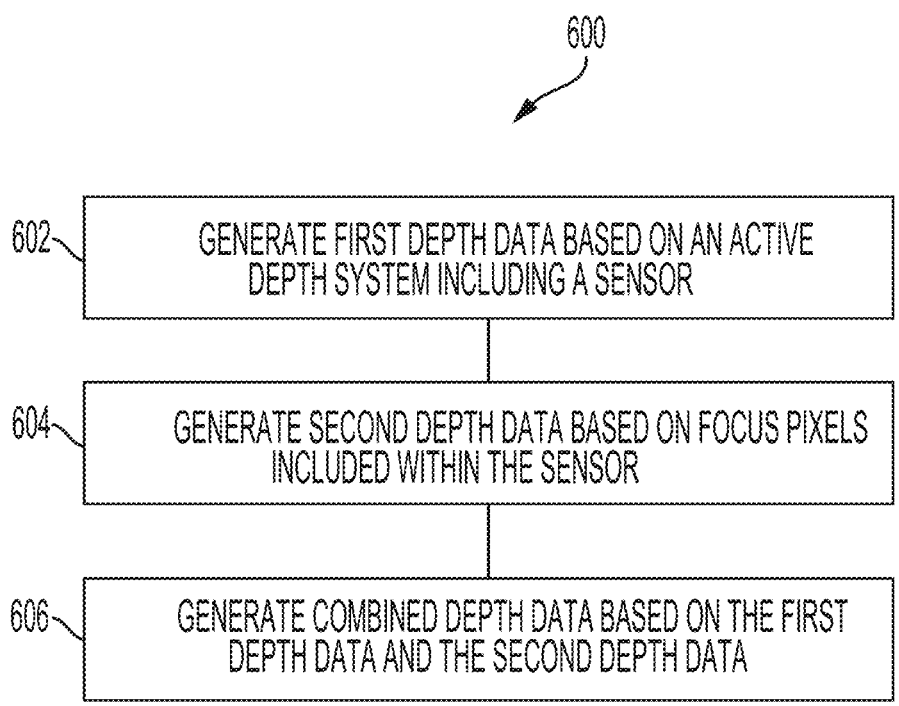
FIG. 6 depicts a flowchart of a method for generating combined depth data.

FIG. 6 is a flowchart of a method of generating combined depth data, according to some embodiments. At block 602, the method 600 may generate first depth data based on an active depth system including a sensor. As discussed above, the active depth system may include a structured light system, a TOF system, or the like. The active depth system may include a transmitter and a receiver. The receiver may include a sensor. At block 604, the method 600 may generate second depth data based on focus pixels included within the sensor. The focus pixels may be included within the same sensor/receiver of the active depth system. At block 606, the method 600 may generate combined depth data and/or a combined depth map based on the first depth data and the second depth data.

Figure 7B:
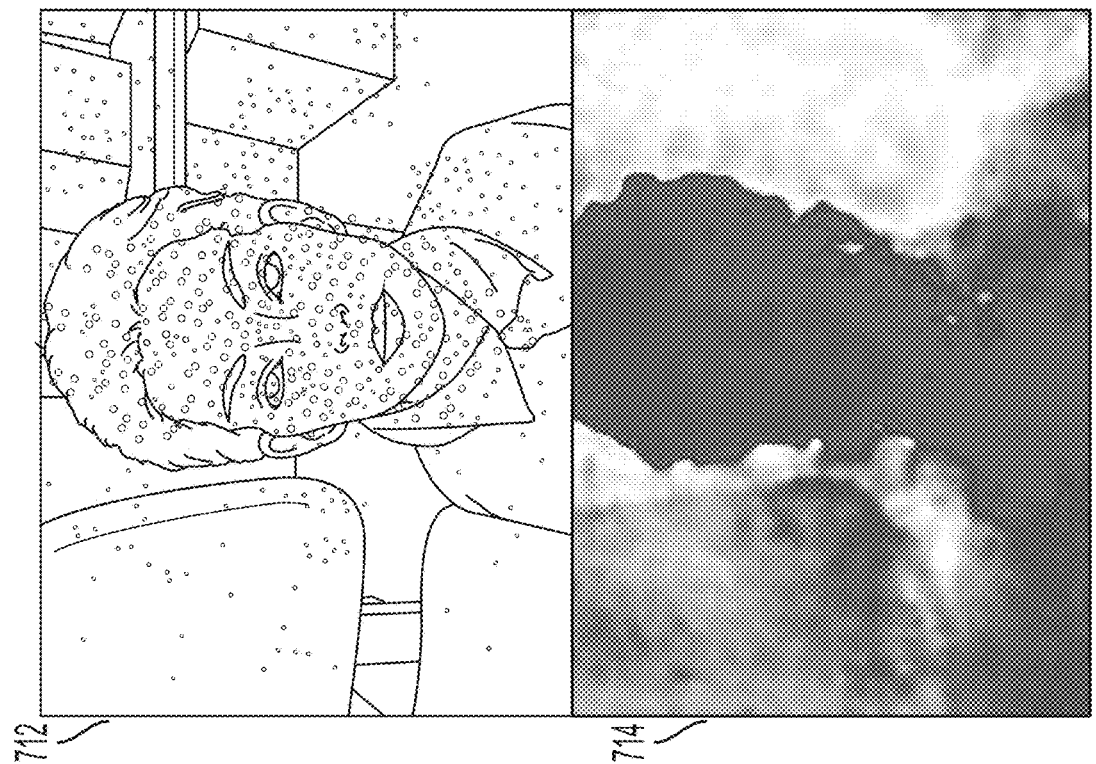
FIG. 7B depicts an example scene and corresponding depth data generated based on a combined depth map.
Figure 7A:
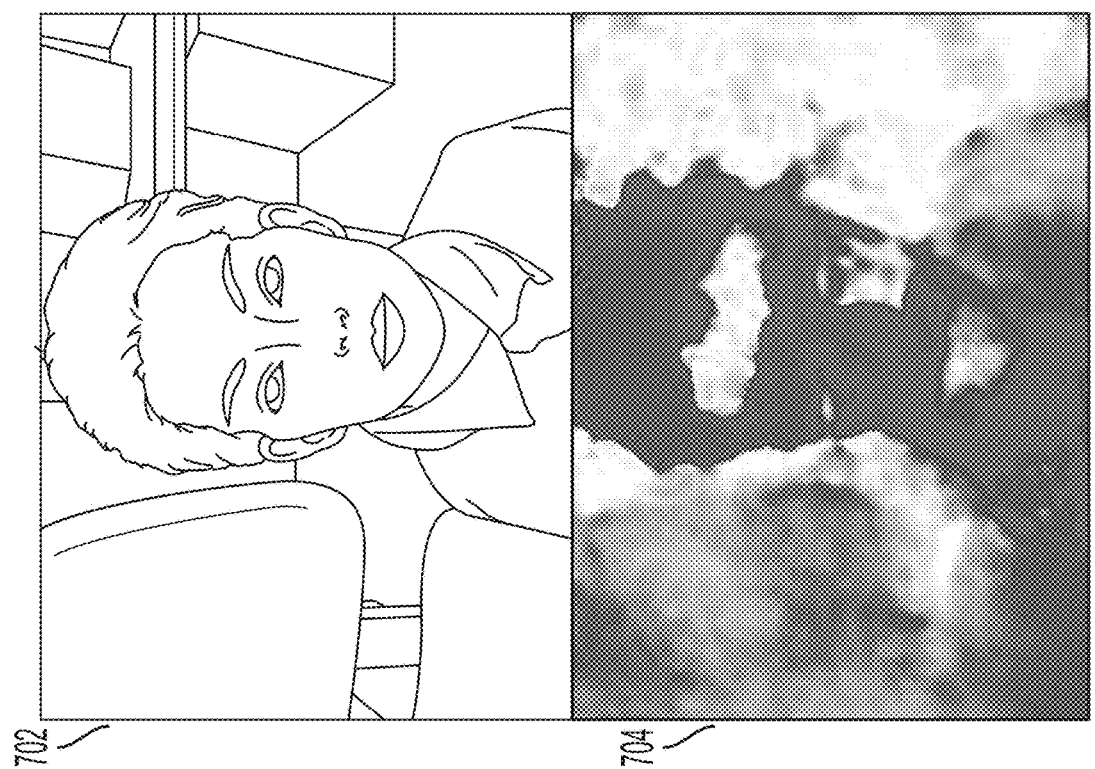
FIG. 7A depicts an example scene and corresponding depth data generated based on a single depth mapping system.

FIG. 7A depicts an example scene 702 and corresponding depth map 704 generated based on a single depth mapping system. The single depth mapping system may include an active depth system, such as structured light, TOF, or the like. Alternatively, the single depth mapping system may include a passive depth system, such as a stereo camera system or focus pixels of a PDAF sensor. As shown in FIG. 7A, the depth map 704 includes gaps (e.g., white or light grey areas) where the face and/or body of the person in the scene 702 should be. FIG. 7B depicts an example scene 712 and corresponding depth map 714 generated based on combined depth data and/or a combined depth map using the techniques disclosed herein. As seen in the scene 712 of FIG. 7B, a source light in the form of dots has been projected onto the scene 712. Combined depth data and/or a combined depth map (e.g., depth map 174) may be generated based on the techniques disclosed herein, including generating first depth data based on received reflections of the dots and/or ambient light at an infrared PDAF sensor, generating second depth data based on the received reflections of the dots and/or ambient light based on focus pixels of the infrared PDAF sensor, and generating the combined depth data and/or combined depth map (e.g., combined depth map 714) based on the first depth data and the second depth data. As seen in FIG. 7B, the combined depth map 714 includes more depth data where the face and/or body of the person is in the scene 712 than the depth map 704 of scene 702, which used only one depth mapping technique without the infrared PDAF sensor disclosed herein.

FIG. 8 is a block diagram of an example device 800 including an active depth system. In some examples, the active depth system may be coupled to the device 800. The example device 800 may include or be coupled to a transmitter 801 (such as transmitter 105 of FIG. 1, transmitter 202 of FIG. 2, and/or transmitter 302 of FIG. 3A), a receiver 802 (such as receiver 104 of FIG. 1, receiver 208 of FIG. 2, and/or receiver 308 of FIG. 3A), a processor 804, a memory 806 storing instructions 808, a depth controller 810 (which may include one or more signal processors 812). The device 800 may optionally include (or be coupled to) a display 814 and a number of input/output (I/O) components 816. The device 800 may optionally include a camera(s) 803 (which may be a single camera, dual camera module, or a module with any number of camera sensors) coupled to a camera controller 822 (which may include one or more image signal processors 824 for processing captures from the camera(s) 803). Image sensor(s) associated with camera(s) 803 may include focus pixels and/or color filters. The device 800 may further optionally include one or more sensors 820 (such as a gyroscope, magnetometer, inertial sensor, NIR sensor, and so on). The device 800 may include additional features or components not shown. For example, a wireless interface, which may include a number of transceivers and a baseband processor, may be included for a wireless communication device. The device 800 may also include a power supply 818, which may be coupled to or integrated into the device 800.

The transmitter 801 and the receiver 802 may be part of an active depth system (such as structured light system 200 of FIG. 2 and/or TOF system 300 in FIG. 3A) controlled by the depth controller 810 and/or the processor 804. The device 800 may include or be coupled to additional active depth systems including one or more structured light systems and/or TOF systems. The disclosure should not be limited to any specific examples or illustrations, including the example device 800. As shown in FIG. 8, the receiver 802 of the active depth system may include one or more focus pixels, as discussed with reference to FIGS. 4A-4E.

The memory 806 may be a non-transient or non-transitory computer readable medium storing computer-executable instructions 808 to perform all or a portion of one or more operations described in this disclosure. The processor 804 may be one or more suitable processors capable of executing scripts or instructions of one or more software programs (such as instructions 808) stored within the memory 806. In some aspects, the processor 804 may be one or more general purpose processors that execute instructions 808 to cause the device 800 to perform any number of functions or operations. In additional or alternative aspects, the processor 804 may include integrated circuits or other hardware to perform functions or operations without the use of software. While shown to be coupled to each other via the processor 804 in the example of FIG. 8, the processor 804, the memory 806, the depth controller 810, the optional display 814, the optional I/O components 816, the optional camera controller 822, and the optional sensor(s) 820 may be coupled to one another in various arrangements. For example, the processor 804, the memory 806, the depth controller 810, the optional display 814, the optional I/O components 816, the optional camera controller 822, and/or the optional sensor(s) 820 may be coupled to each other via one or more local buses (not shown for simplicity). One or more local buses may be any of a variety of bus structures, such as a third-generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components of FIG. 8 is merely exemplary, and other configurations of devices with the same or different components may be used to implement the techniques of this disclosure.

The display 814 may be any suitable display or screen allowing for user interaction and/or to present items (such as a depth map or a preview image of the scene) for viewing by a user. In some aspects, the display 814 may be a touch-sensitive display. The I/O components 816 may be or include any suitable mechanism, interface, or device to receive input (such as commands) from the user and to provide output to the user. For example, the I/O components 816 may include (but are not limited to) a graphical user interface, keyboard, mouse, microphone and speakers, squeezable bezel or border of the device 800, physical buttons located on device 800, and so on. The display 814 and/or the I/O components 816 may provide a preview image or depth map of the scene to a user and/or receive a user input for adjusting one or more settings of the device 800 (such as adjusting an intensity of the emissions by transmitter 801, determining or switching a mode of the active depth system, adjusting a field of emission of the transmitter 801, and so on).

The depth controller 810 may include a signal processor 812, which may be one or more processors to process measurements provided/received by the receiver 802 and/or control the transmitter 801 (such as switching modes). In some aspects, the signal processor 812 may execute instructions from a memory (such as instructions 808 from the memory 806 or instructions stored in a separate memory coupled to the signal processor 812). In other aspects, the signal processor 812 may include specific hardware for operation. The signal processor 812 may alternatively or additionally include a combination of specific hardware and the ability to execute software instructions.

The detailed description is directed to certain specific embodiments. However, different embodiments may be contemplated. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A device, comprising:
    an active depth system, the active depth system including:
        a projector configured to transmit a source light onto a scene;
        an infrared phase detection autofocus (PDAF) sensor configured to receive reflections of the source light off of objects within the scene, the infrared PDAF sensor including a first set of pixels including focus pixels;
    a memory; and
    a processor coupled to the infrared PDAF sensor and the memory, the processor configured to:
        generate first depth data based on the received reflections of the source light;
        generate second depth data based on signals generated from corresponding pairs of the focus pixels;
        compare a first confidence value of a first set of confidence values associated with the first depth data to a corresponding second confidence value of a second set of confidence values associated with the second depth data;
        determine, based on the comparison, a higher confidence value between the first confidence value and the corresponding second confidence value; and
        generate combined depth data for a depth map including depth values from the first depth data and depth values from the second depth data, the combined depth data including a depth value selected from the first depth data or the second depth data based on the depth value being associated with the higher confidence value, wherein the combined depth data generated for the depth map represents depths of objects in the scene relative to the device.

2. The device of claim 1, wherein the infrared PDAF sensor includes a second set of pixels including a narrowband filter.

3. The device of claim 1, wherein the processor is configured to generate the second depth data based on determined disparities between the signals generated from corresponding pairs of focus pixels.

4. The device of claim 2, wherein at least a subset of the first set of pixels includes the narrowband filter.

5. The device of claim 1, wherein the infrared PDAF sensor includes one or more filters.

6. The device of claim 5, wherein the one or more filters includes one or more of a narrowband filter.

7. The device of claim 5, wherein the one or more filters includes one or more of a color filter.

8. The device of claim 5, wherein the one or more filters is mechanically controlled to move above one or more pixels of the infrared PDAF sensor.

9. The device of claim 1, wherein the processor is configured to generate the first depth data based on the active depth system.

10. The device of claim 1, wherein the source light includes infrared light.

11. The device of claim 1, wherein the source light includes a pattern.

12. The device of claim 11, wherein the pattern includes a structured pattern.

13. The device of claim 1, wherein the source light includes a flood pattern.

14. The device of claim 1, wherein the processor is further configured to:
    determine the first set of confidence values associated with the first depth data; and
    determine the second set of confidence values associated with the second depth data.

15. The device of claim 14, wherein, to generate the combined depth data, the processor is configured to combine a portion of the first depth data and a portion of the second depth data based upon the first set of confidence values associated with the first depth data and the second set of confidence values associated with the second depth data.

16. The device of claim 15, wherein, to combine the portion of the first depth data and the portion of the second depth data based upon the first set of confidence values associated with the first depth data and the second set of confidence values associated with the second depth data, the processor is configured to:
    assign a first weight to a first depth value associated with the first confidence value of the first set of confidence values associated with the first depth data;
    assign a second weight to a corresponding second depth value associated the corresponding second confidence value of the second set of confidence values associated with the second depth data, wherein the first weight is proportional to the first confidence value and the second weight is proportional to the corresponding second confidence value; and
    select a first weighted depth value associated with the first depth data and a second weight depth value associated with the second depth data to include within the combined depth data.

17. A method, comprising:
    generating first depth data based on an active depth system including an infrared phase detection autofocus (PDAF) sensor, the infrared PDAF sensor including a first set of pixels including focus pixels;

generating second depth data based on signals generated from corresponding pairs of the focus pixels;

comparing a first confidence value of a first set of confidence values associated with the first depth data to a corresponding second confidence value of a second set of confidence values associated with the second depth data;

determining, based on the comparison, a higher confidence value between the first confidence value and the corresponding second confidence value; and generating combined depth data for a depth map including depth values from the first depth data and depth values from the second depth data, the combined depth data including a depth value selected from the first depth data or the second depth data based on the depth value being associated with the higher confidence value, wherein the combined depth data generated for the depth map represents depths of objects in a scene.

18. The method of claim 17, wherein the infrared PDAF sensor includes a second set of pixels including a narrowband filter.

19. The method of claim 17, wherein generating the second depth data is based on determined disparities between the signals generated from corresponding pairs of focus pixels.

20. The method of claim 18, wherein at least a subset of the first set of pixels includes the narrowband filter.

21. The method of claim 17, wherein the infrared PDAF sensor includes one or more filters.

22. The method of claim 21, wherein the one or more filters includes one or more of a narrowband filter.

23. The method of claim 21, wherein the one or more filters includes one or more of a color filter.

24. The method of claim 21, wherein the one or more filters is mechanically controlled to move above one or more pixels of the infrared PDAF sensor.

25. The method of claim 17, further comprising:
transmitting, via a projector, a source light onto a scene; and
receiving, via the infrared PDAF sensor, reflections of the source light off of objects within the scene.

26. The method of claim 25, wherein the source light includes infrared light.

27. The method of claim 25, wherein the source light includes a pattern.

28. The method of claim 27, wherein the pattern includes a structured pattern.

29. The method of claim 25, wherein the source light includes a flood pattern.

30. The method of claim 17, further comprising:
determining the first set of confidence values associated with the first depth data; and
determining the second set of confidence values associated with the second depth data.

31. The method of claim 30, wherein generating the combined depth data includes combining a portion of the first depth data and a portion of the second depth data based upon the first set of confidence values associated with the first depth data and the second set of confidence values associated with the second depth data.

32. The device of claim 1, wherein the active depth system is calibrated based on the second depth data.

33. The method of claim 17, wherein the active depth system is calibrated based on the second depth data.

* * * * *